Sept. 4, 1956  J. S. BURGE ET AL  2,761,559
ASSEMBLING MACHINE
Filed Oct. 30, 1950  27 Sheets-Sheet 1
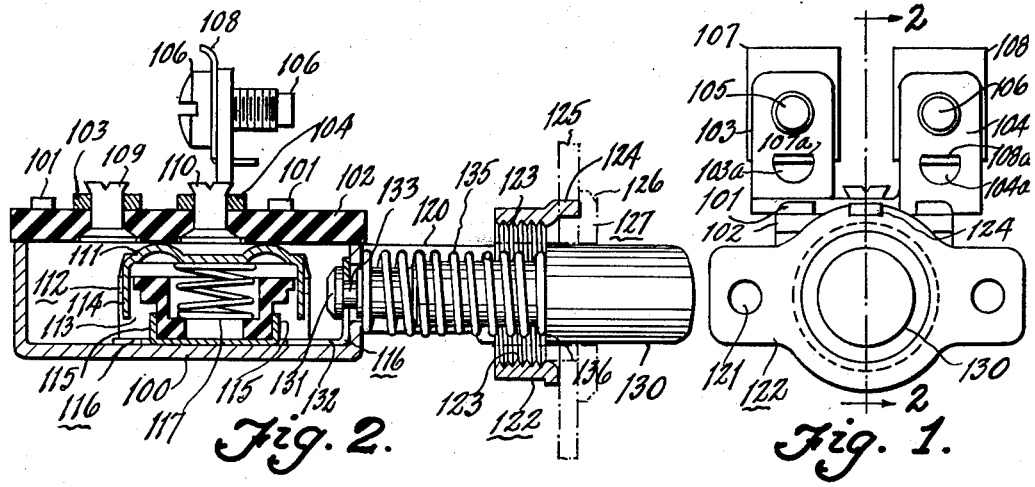
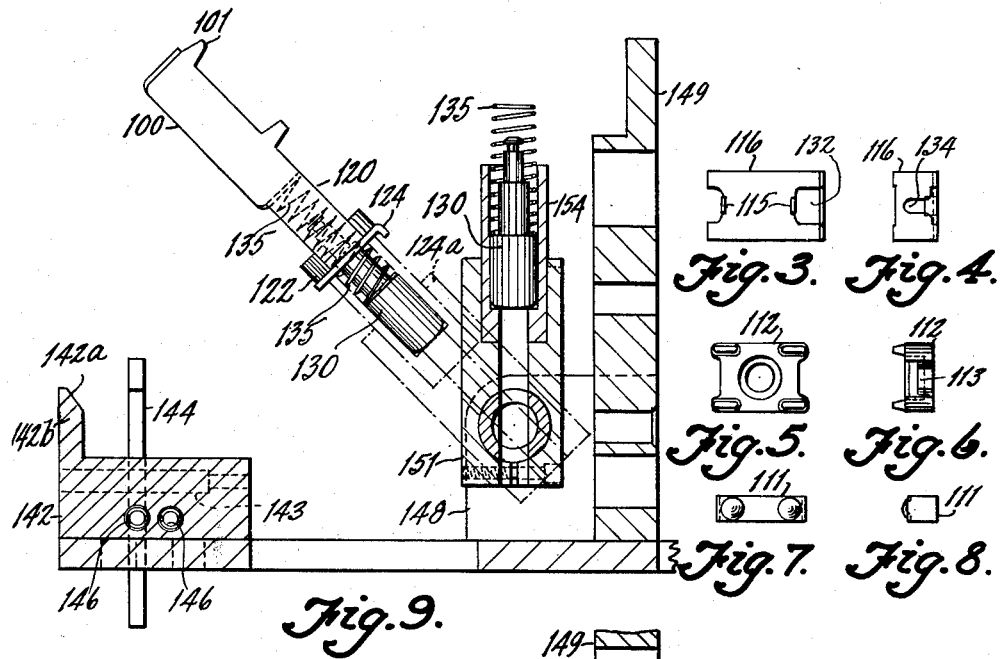
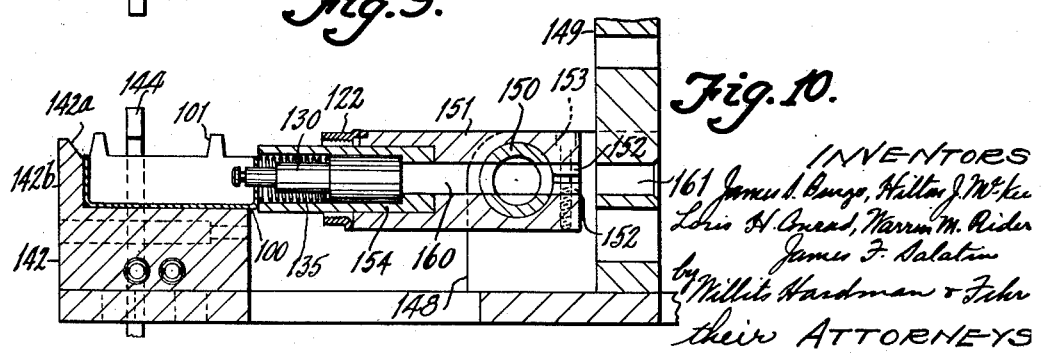

Sept. 4, 1956 J. S. BURGE ET AL 2,761,559
ASSEMBLING MACHINE
Filed Oct. 30, 1950 27 Sheets-Sheet 2

INVENTORS
James S. Burge, Hilton J. McKee
Loris H. Conrad, Warren M. Rider
James F. Calatin
by Willits Hardman & Fehr
their ATTORNEYS

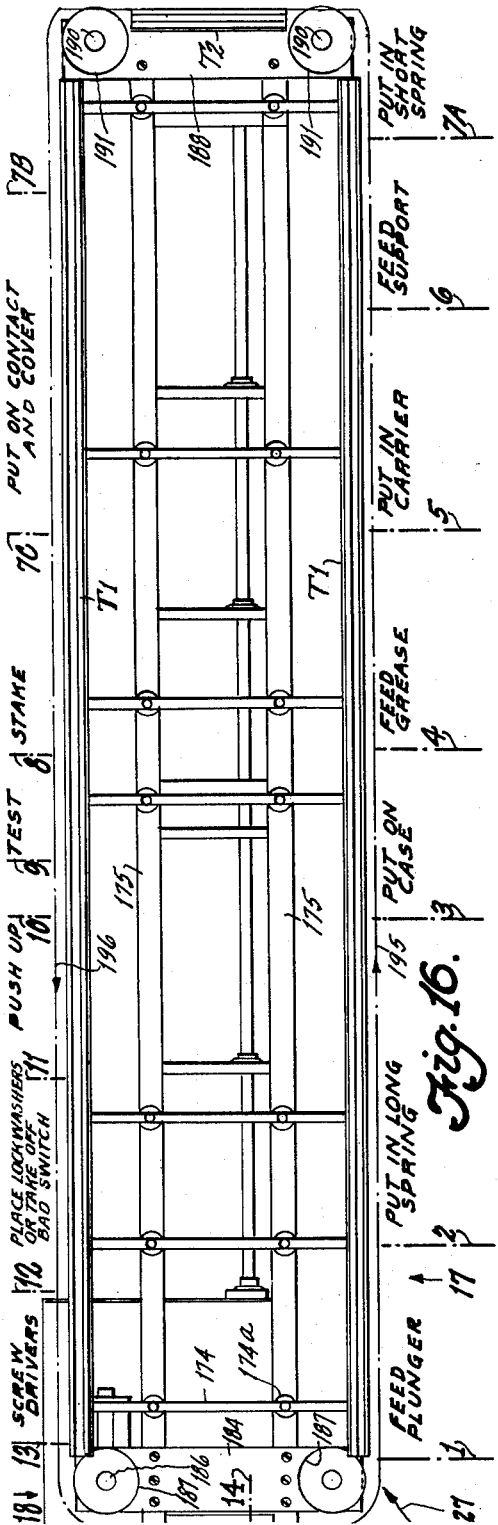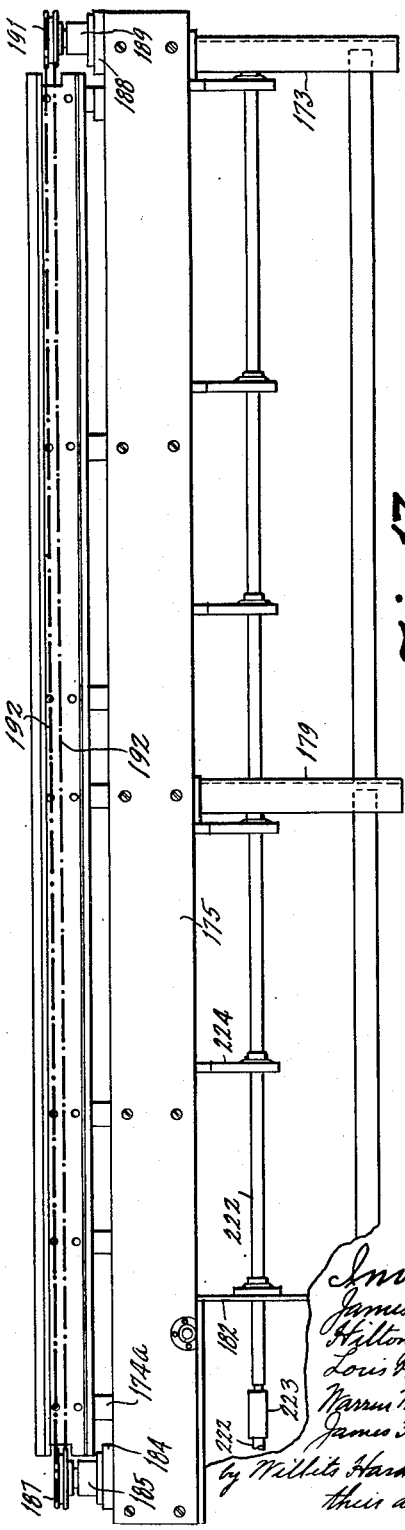

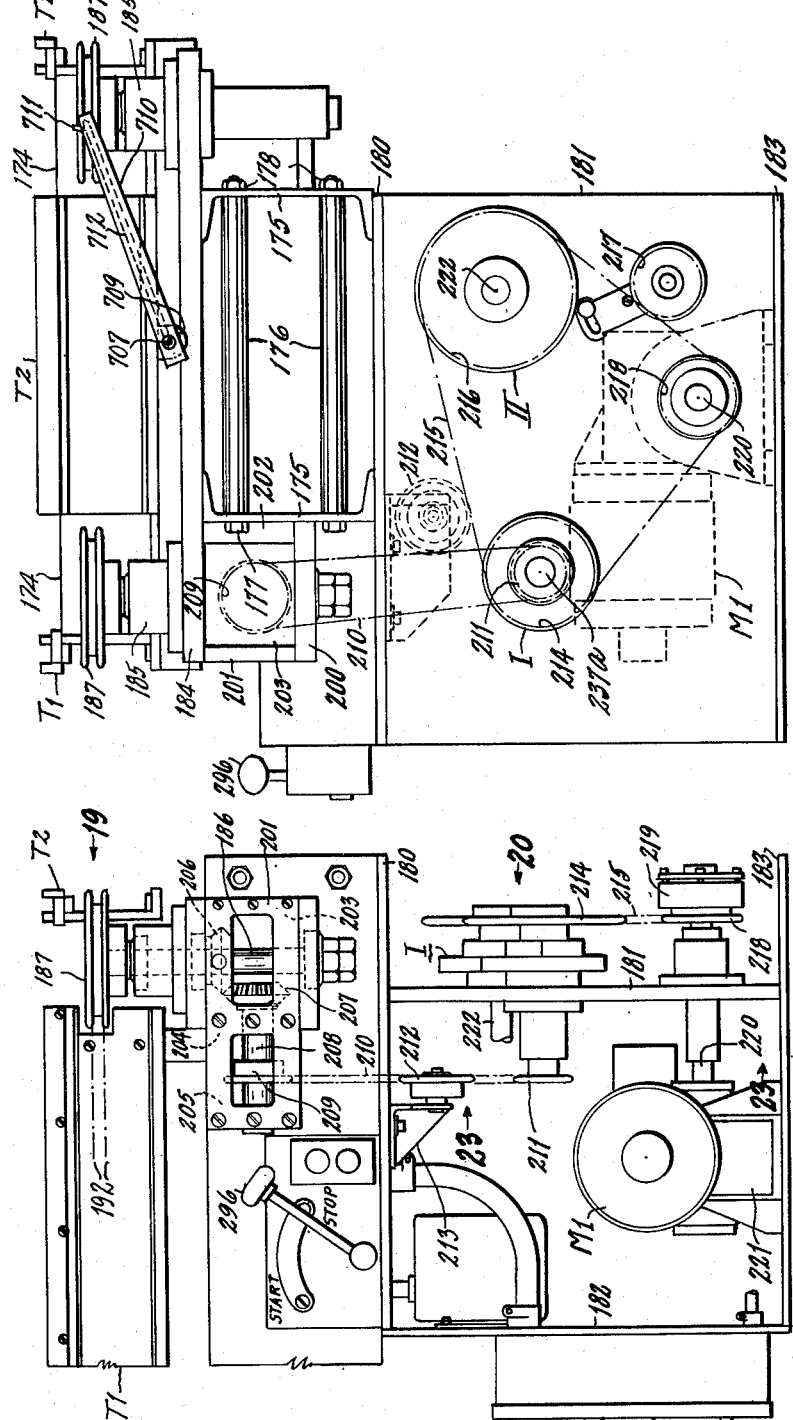

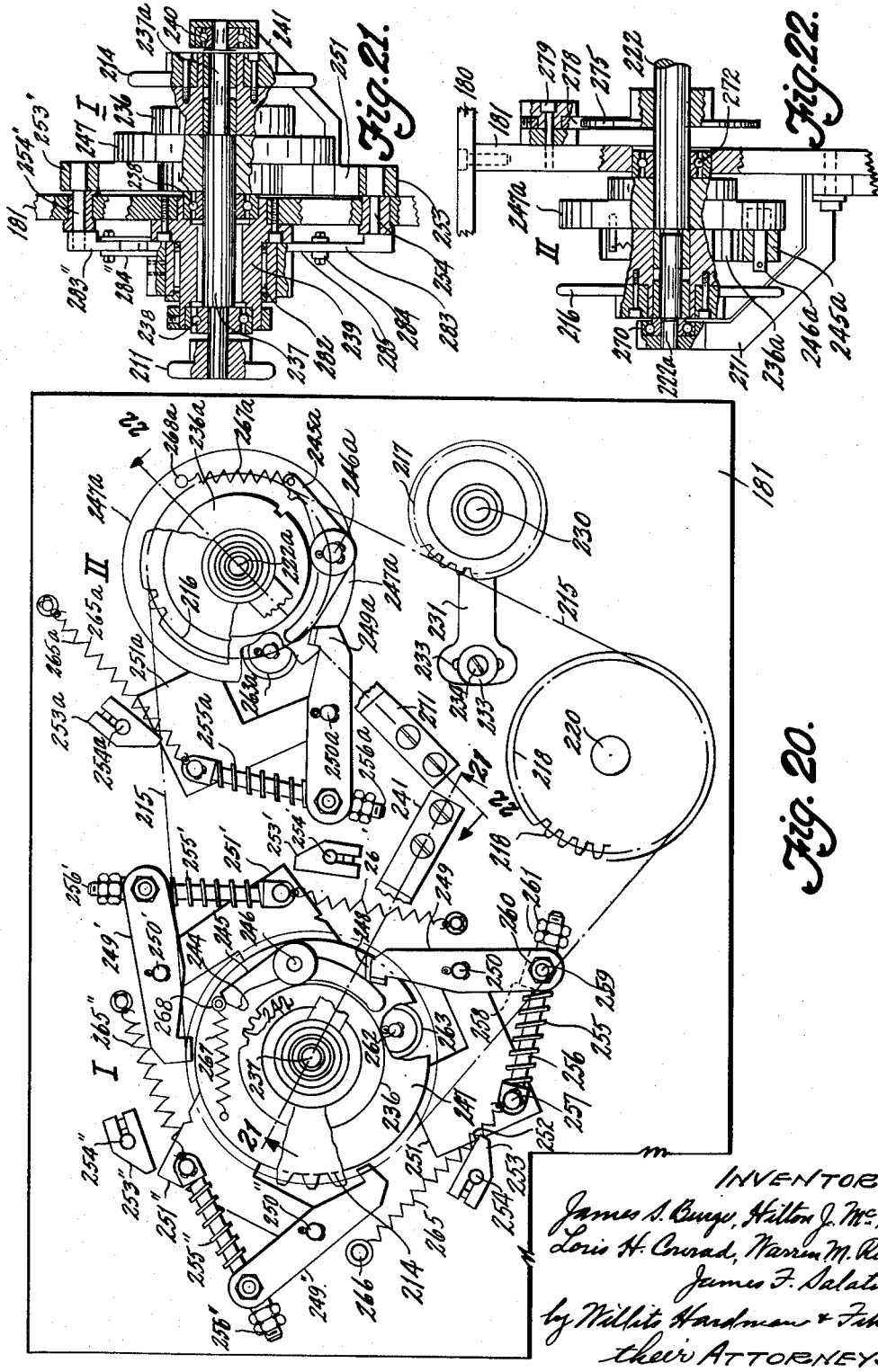

INVENTORS
James S. Burge, Hilton J. McKee
Loris H. Conrad, Warren M. Rider
James F. Salatin
by Willits, Hardman & Fehr
their ATTORNEYS Sept. 4, 1956 J. S. BURGE ET AL 2,761,559
ASSEMBLING MACHINE
Filed Oct. 30, 1950 27 Sheets-Sheet 7
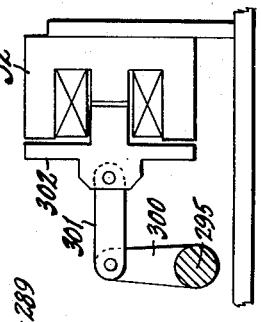
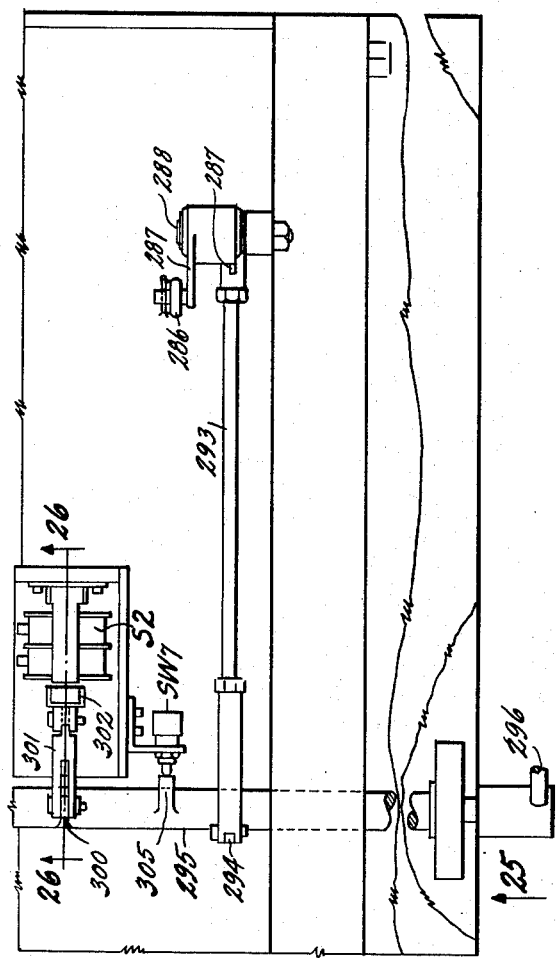
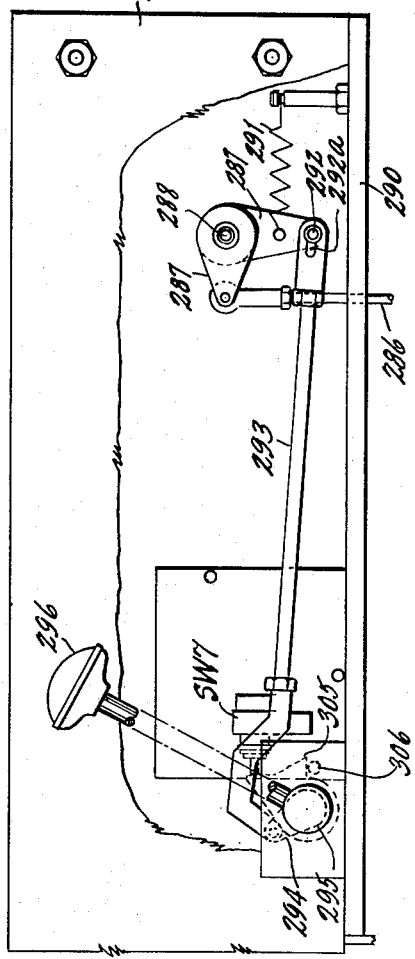

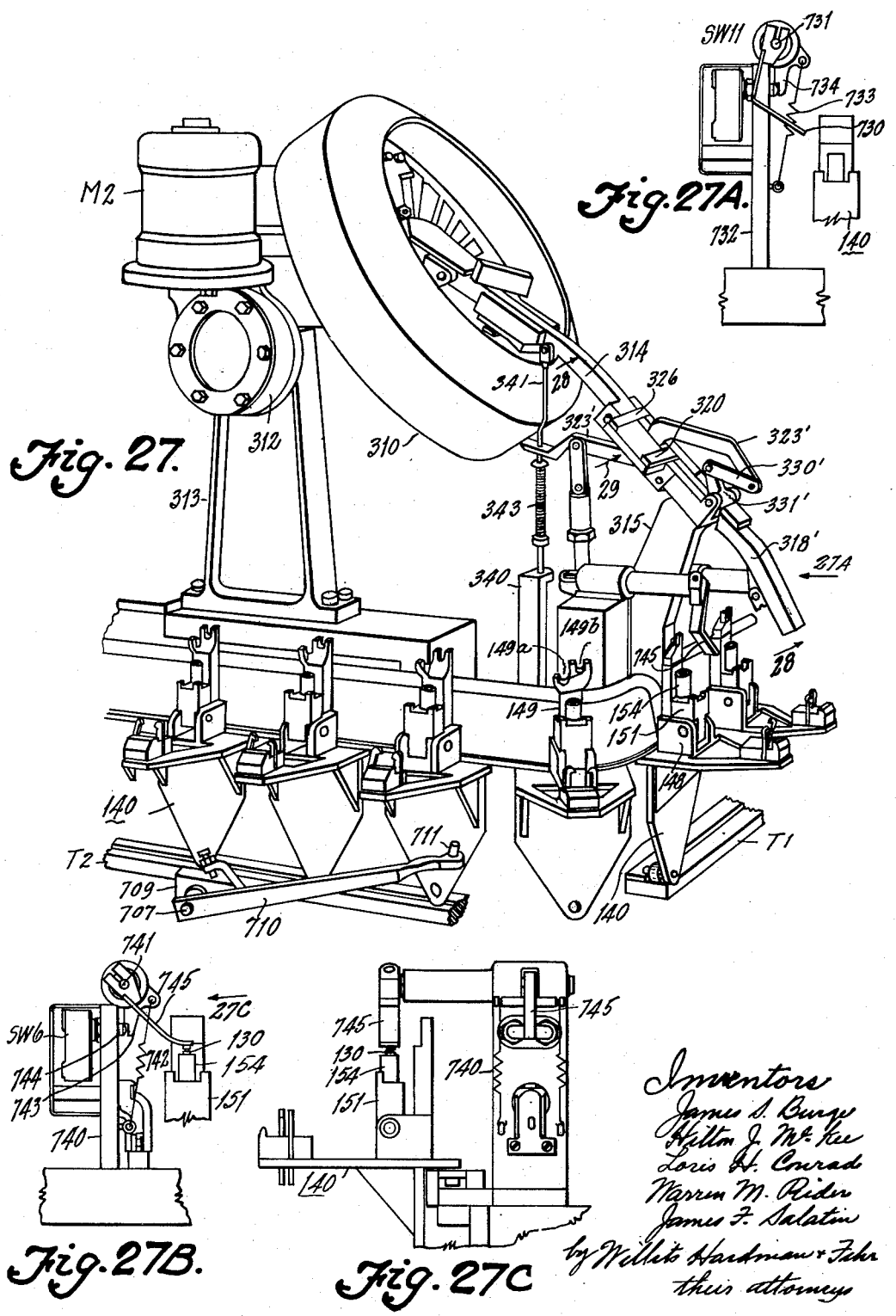

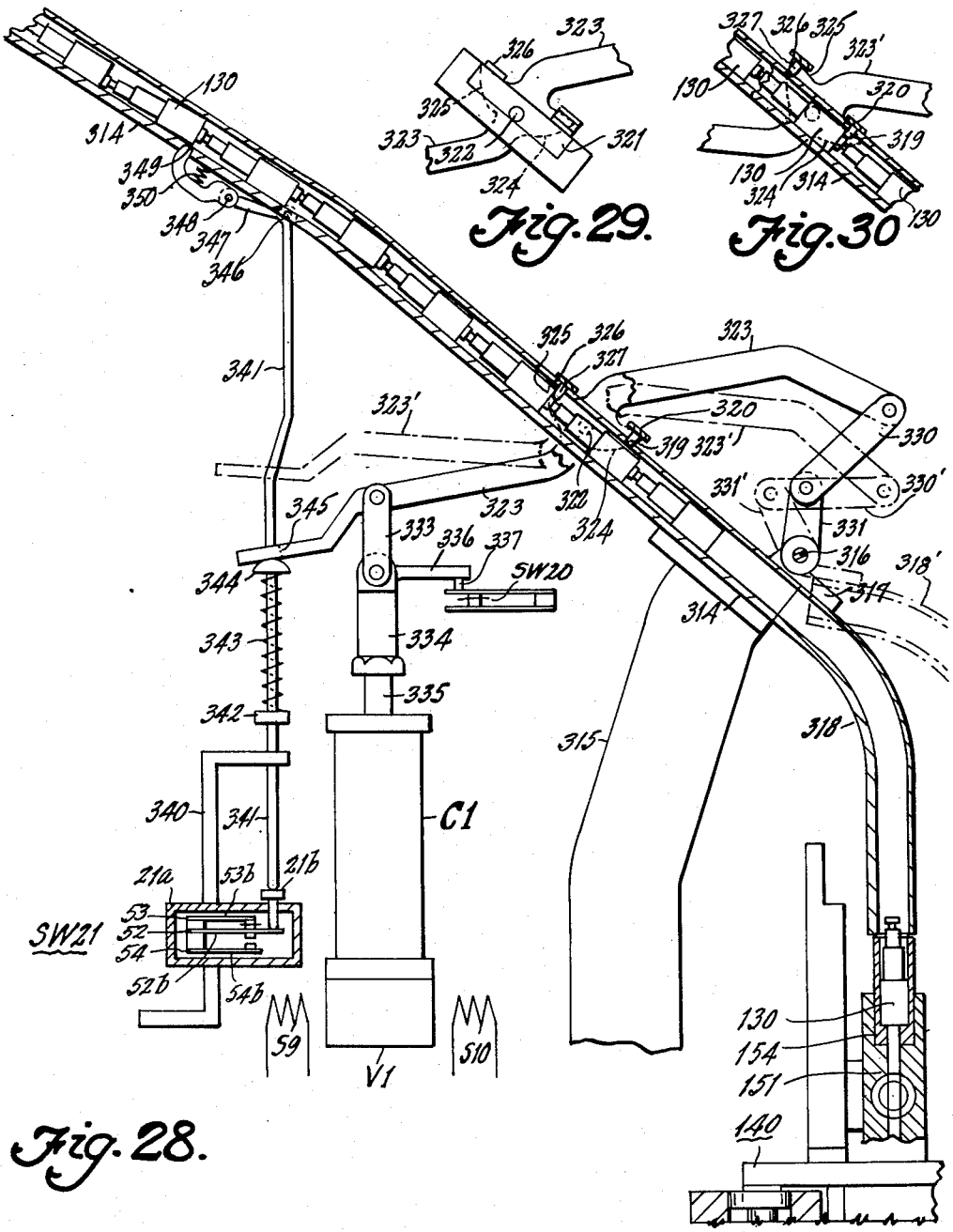

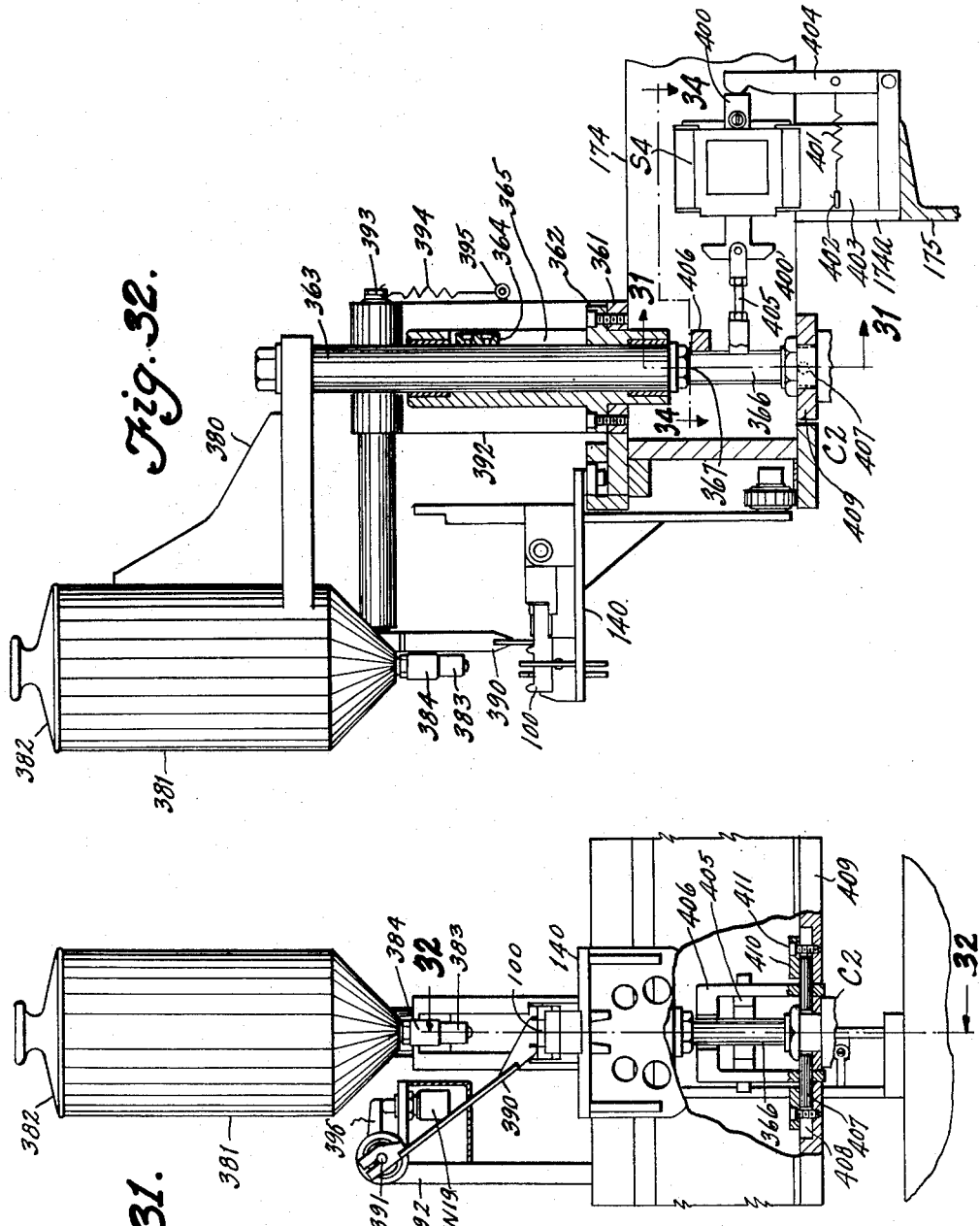

Sept. 4, 1956  J. S. BURGE ET AL  2,761,559
ASSEMBLING MACHINE
Filed Oct. 30, 1950  27 Sheets-Sheet 11

INVENTORS
James S. Burge,
Hilton J. McKee
Louis H. Conrad
Warren M. Rider James F. Valatin
by Willits Hardman & Fehr
their ATTORNEYS

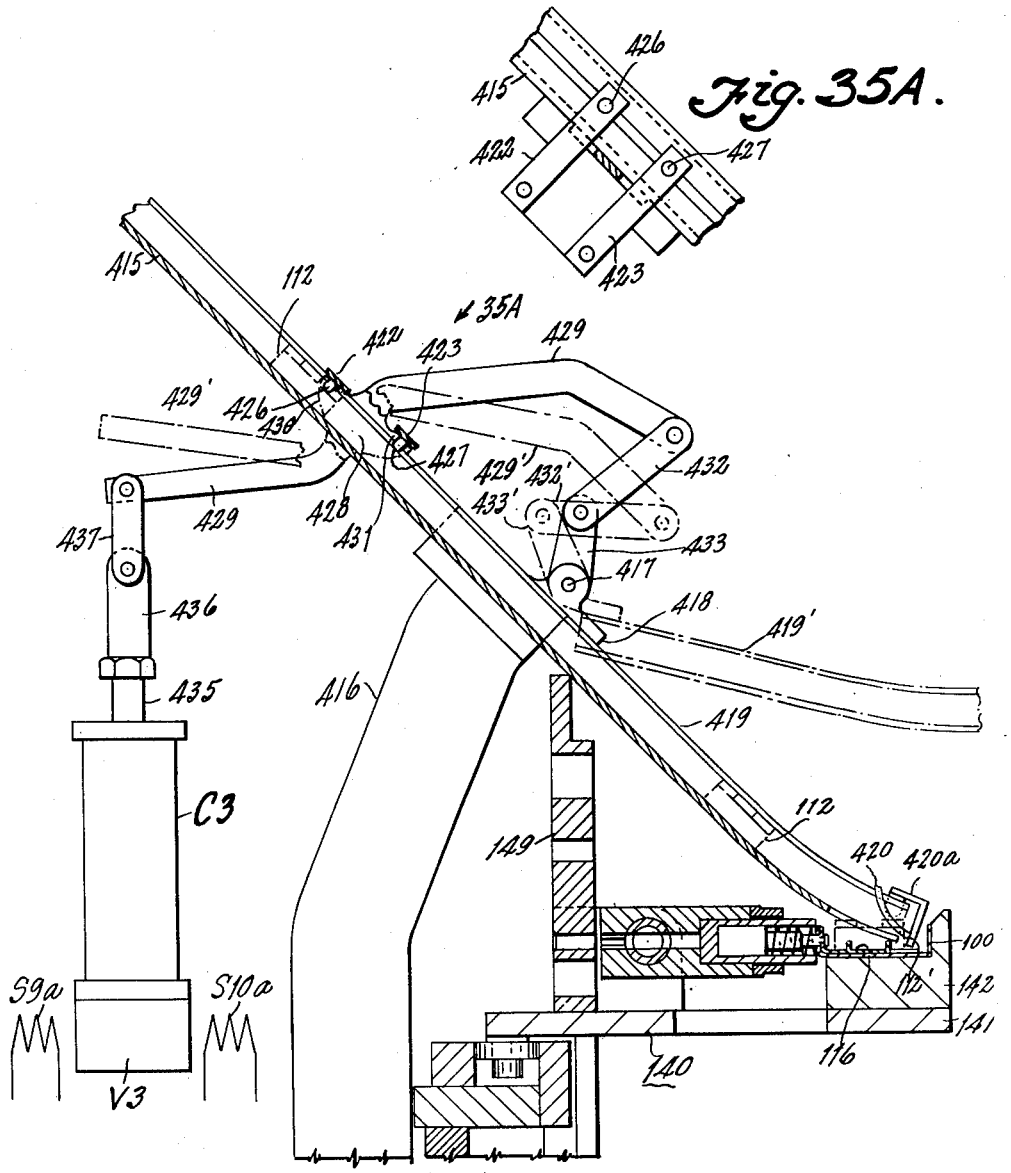

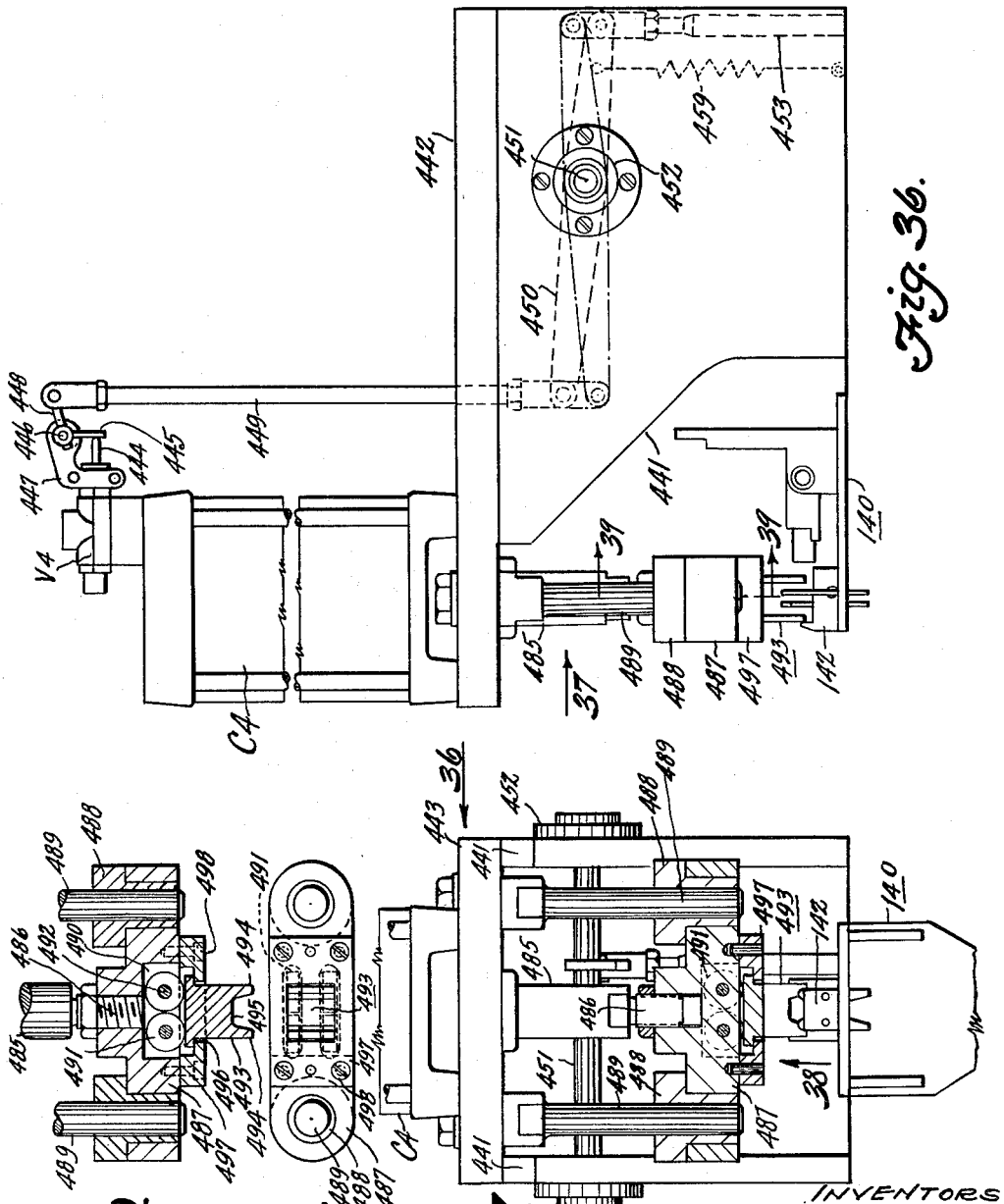

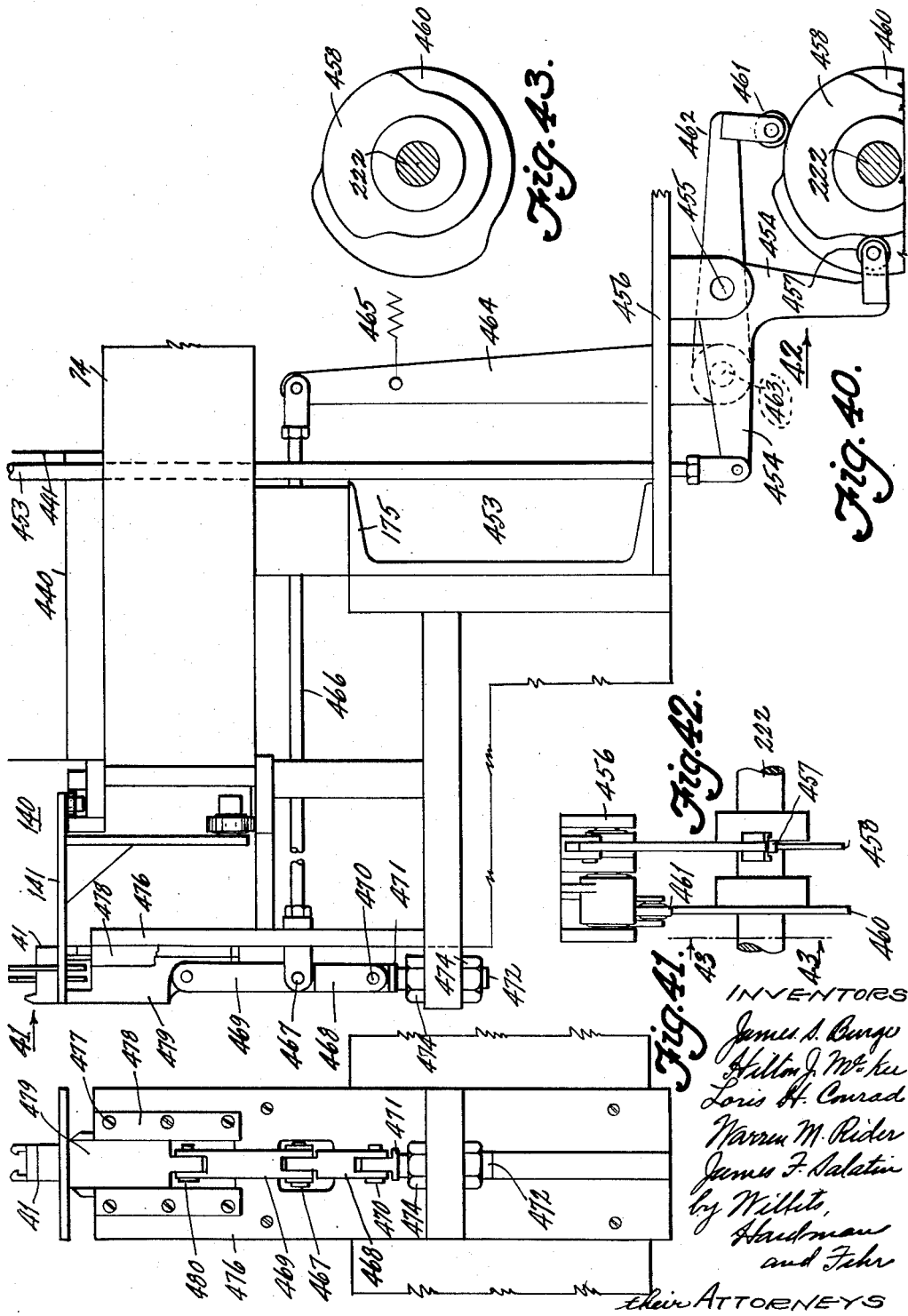

Sept. 4, 1956
J. S. BURGE ET AL
2,761,559
ASSEMBLING MACHINE
Filed Oct. 30, 1950
27 Sheets-Sheet 15
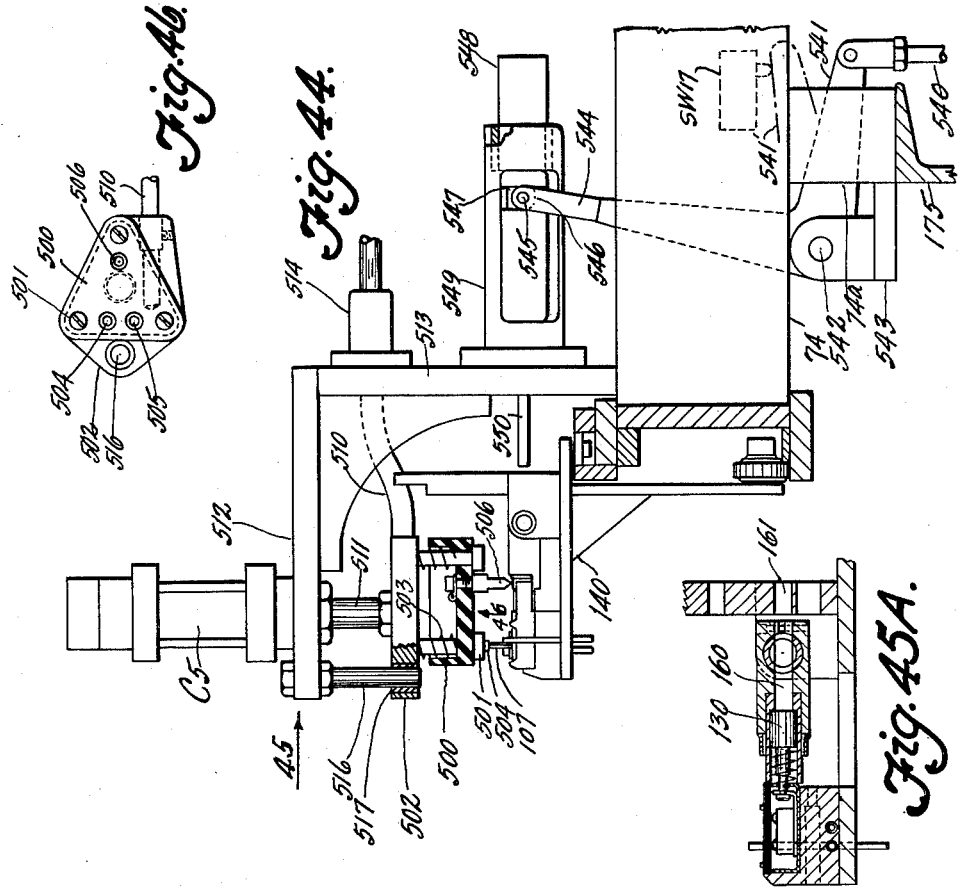
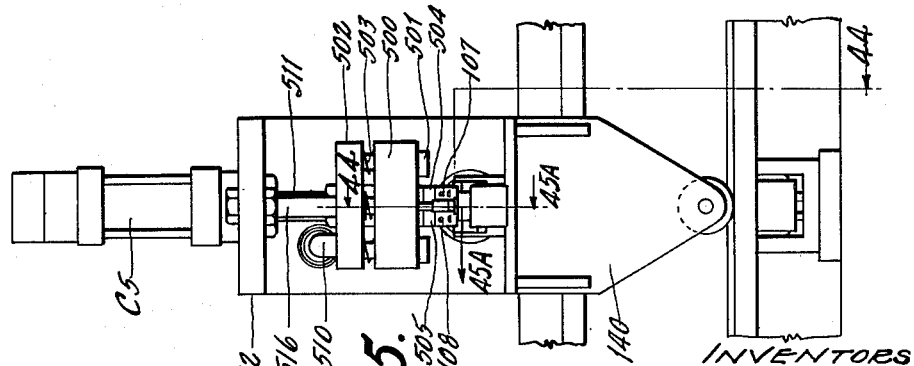
INVENTORS
James S. Burge, Hilton J. McKee
Loris H. Conrad, Warren M. Rider
James F. Salatin
by Willets Hardman & Fehr
their ATTORNEYS Sept. 4, 1956          J. S. BURGE ET AL          2,761,559

ASSEMBLING MACHINE

Filed Oct. 30, 1950          27 Sheets-Sheet 16

Sept. 4, 1956  J. S. BURGE ET AL  2,761,559
ASSEMBLING MACHINE
Filed Oct. 30, 1950  27 Sheets-Sheet 17

INVENTORS
James S. Burge
Hilton J. McKee
Louis H. Conrad
Warren M. Rider
James F. Dalatin
by Willits Hardman & Fike
their ATTORNEYS

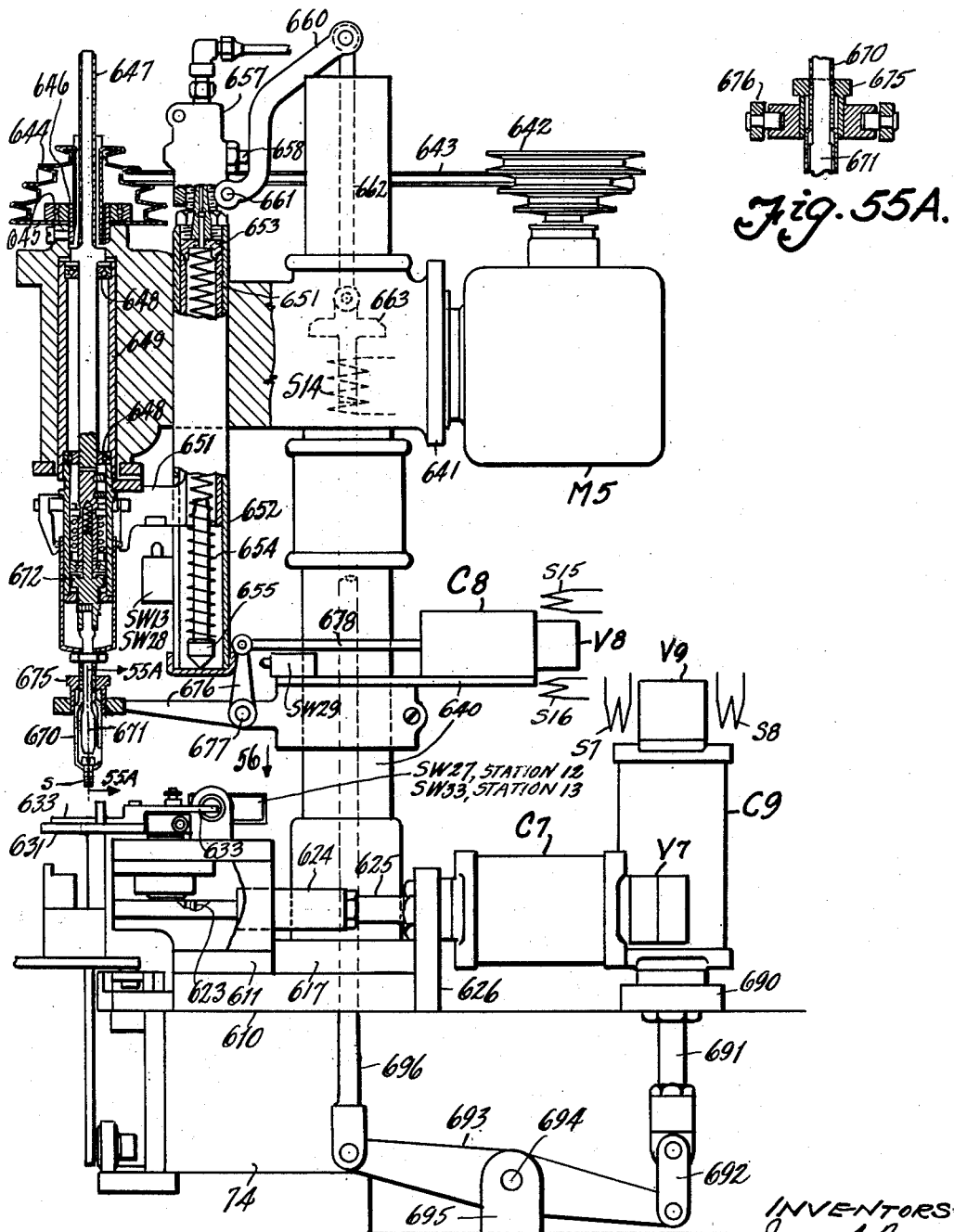

Sept. 4, 1956

J. S. BURGE ET AL 2,761,559

ASSEMBLING MACHINE

Filed Oct. 30, 1950

INVENTORS
James S. Burge
Hilton J. McKee
Loris H. Conrad
Warren M. Rider
James F. Calatin
by Willits Hardman & Fisher
their ATTORNEYS

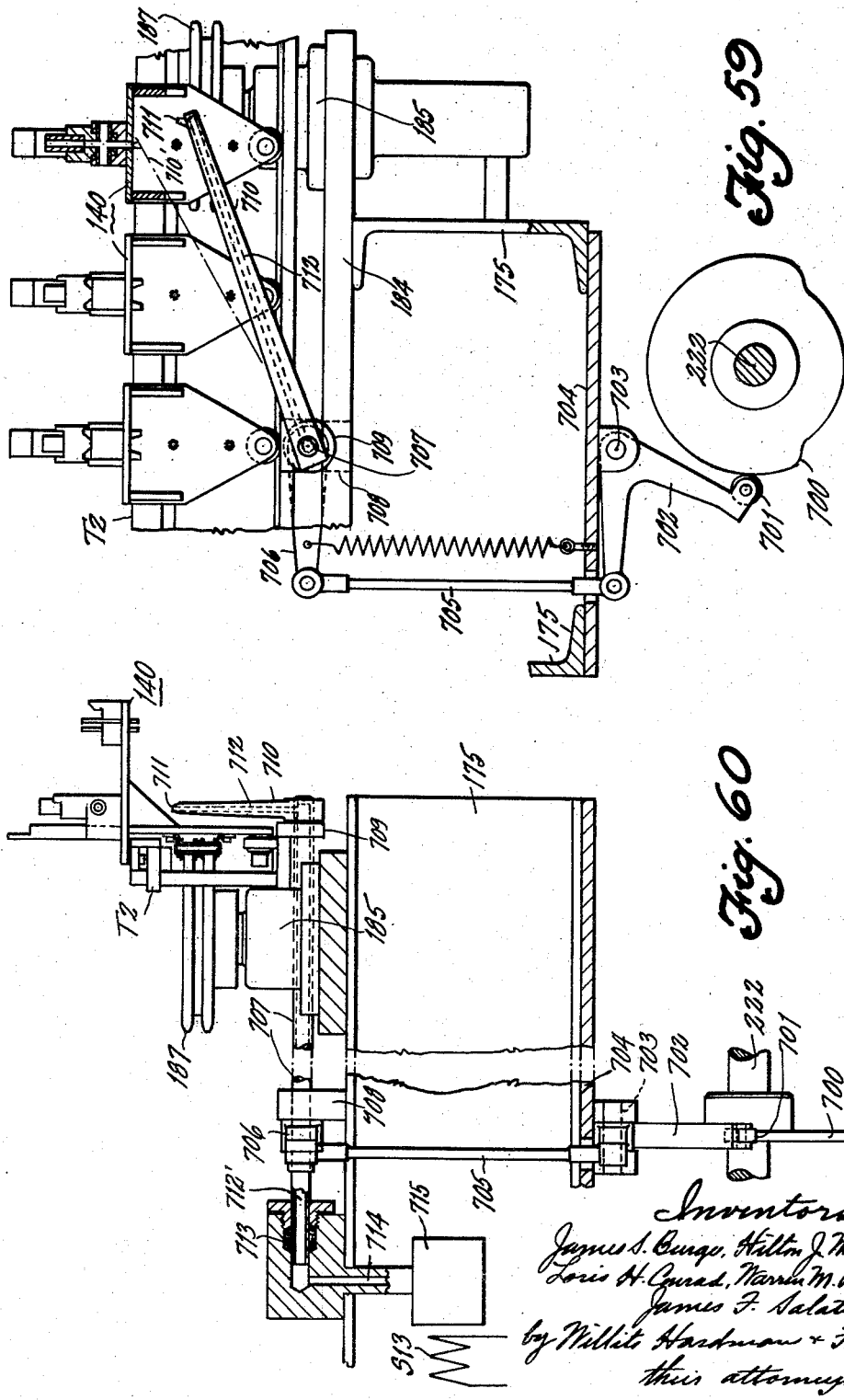

Sept. 4, 1956 J. S. BURGE ET AL 2,761,559
ASSEMBLING MACHINE
Filed Oct. 30, 1950 27 Sheets-Sheet 22
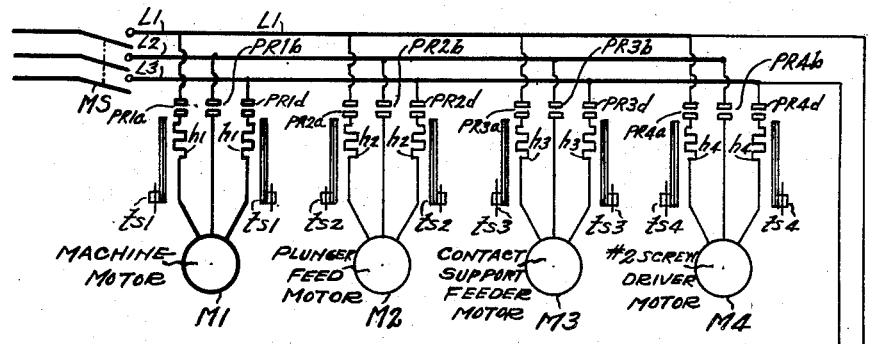
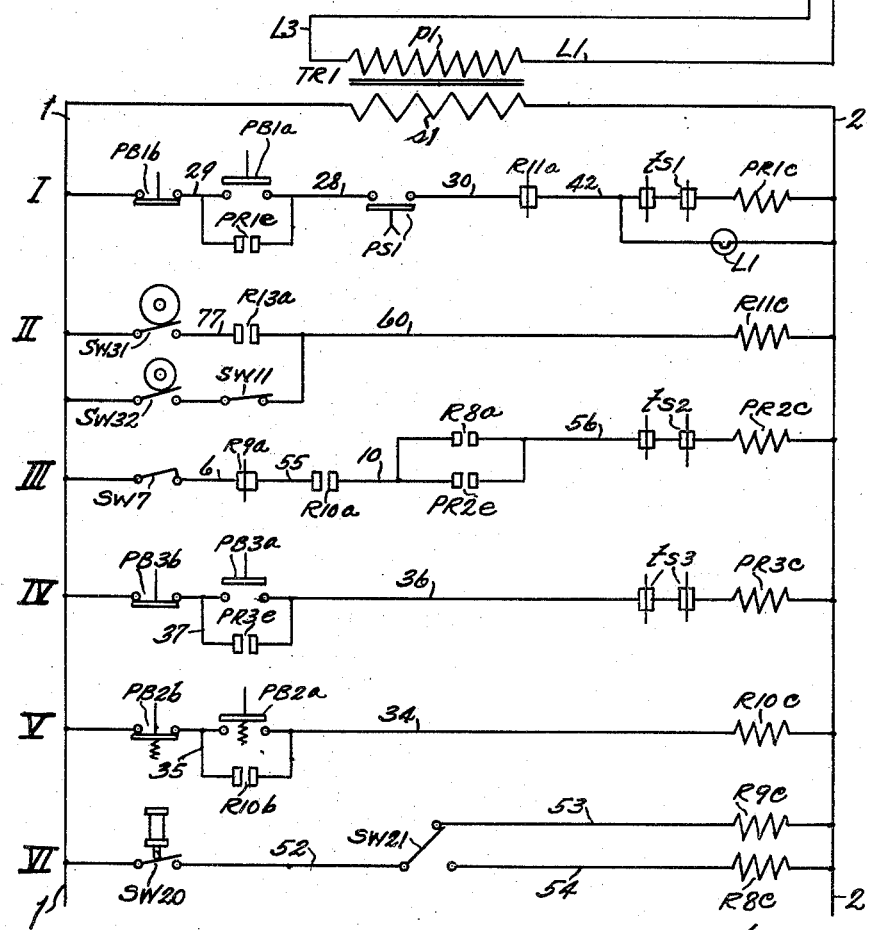
Fig. 61.
INVENTORS
James S. Burge
Hilton J. McKee
Loris H. Conrad
Warren M. Rider
by Willits Hardman & Icho
their ATTORNEYS Sept. 4, 1956          J. S. BURGE ET AL          2,761,559
ASSEMBLING MACHINE
Filed Oct. 30, 1950          27 Sheets-Sheet 25

INVENTORS
James S. Burge
Hilton J. McKee
Loris H. Conrad
Warren M. Rider
James F. Salatin
by Willets Hardman & Fehr
their ATTORNEYS Sept. 4, 1956    J. S. BURGE ET AL    2,761,559
ASSEMBLING MACHINE
Filed Oct. 30, 1950    27 Sheets-Sheet 26

United States Patent Office 2,761,559
Patented Sept. 4, 1956

2,761,559

ASSEMBLING MACHINE

James S. Burge, Anderson, Hilton J. McKee, Middletown, and Loris H. Conrad, James F. Salatin, and Warren M. Rider, Anderson, Ind., assignors to General Motors Corporation, Detroit, Mich., a corporation of Delaware Application October 30, 1950, Serial No. 192,912

8 Claims. (Cl. 209—71)

This invention relates to electric switches of the push button type used for example in the control of the starting motor on an automotive vehicle.

An object of the invention is to facilitate the assembling and testing of a push button switch. This object is accomplished by a machine comprising a conveyor which moves switch holders successively to a series of stations at which some parts are assembled automatically and other manually. At one station the switch is tested. At a following station the switch is ejected if it did not pass the test. After a switch which had passed the test has been completely assembled, it passes to the last station where it is automatically removed from its holder.

Further objects and advantages of the present invention will be apparent from the following description, reference being had to the accompanying drawings wherein a preferred embodiment of the present invention is clearly shown.

In the drawings:

Fig. 1 is an enlarged scale end view of a switch assembled by the machine embodying the present invention;

Fig. 2 is a sectional view on line 2—2 of Fig. 1;

Figs. 3 and 4 are respectively plan and end views of the switch contact carriers.

Figs. 5 and 6 are respectively plan and end views of the switch contact support.

Figs. 7 and 8 are respectively plan and end views of the switch contact which is mounted on the support shown in Figs. 5 and 6.

Fig. 9 is a longitudinal sectional view of a switch holder with the switch button or plunger and plunger return spring mounted thereon.

Fig. 10 is a view similar to Fig. 9 showing the switch holder with its movable parts in horizontal position, the switch case being shown assembled with the holder.

Figure 11:
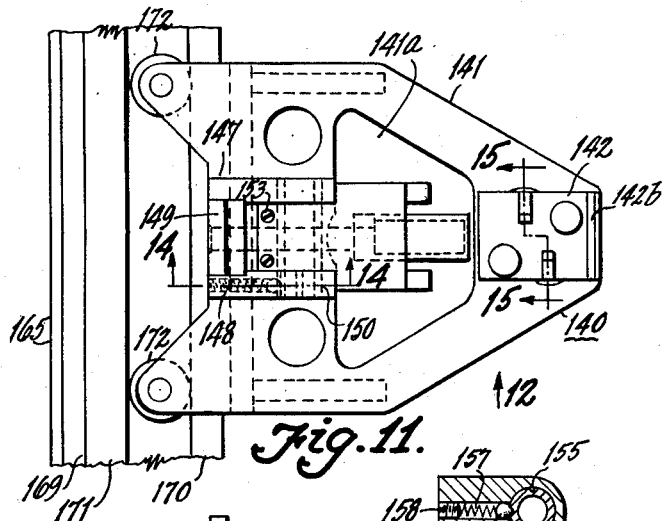
Fig. 11 is a plan view of the switch holder on a smaller scale than Figs. 9 and 10 together with a holder track.
Figure 15:
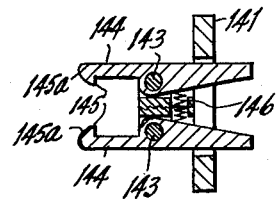
Figure 14:
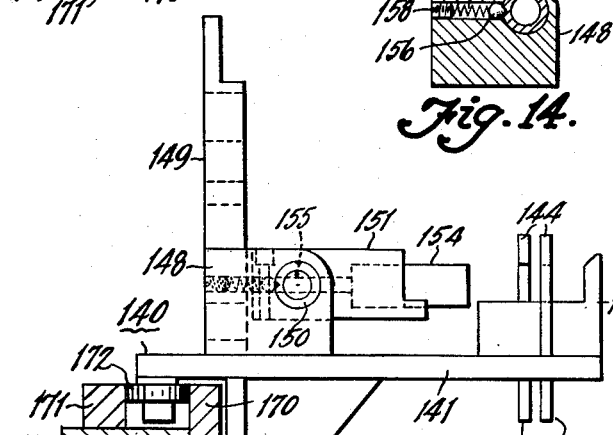

Figs. 14 and 15 are sectional views respectively on lines 14—14 and 15—15 of Fig. 11.

Fig. 16 is a plan view of the machine frame showing the holder track and support therefor and showing the locations of various stations to which the holders are successively moved.

Fig. 17 is a view in the direction of arrow 17 of Fig. 16.

Fig. 18 is a fragmentary side view of the machine looking in the direction of arrow 18 in Fig. 16 and shows mechanism for operating a conveyor which moves the switch holders.

Fig. 19 is a view in the direction of arrow 19 of Fig. 18.

Fig. 20 is a view on a larger scale than Fig. 18, in the direction of arrow 20 of Fig. 18.

Figs. 20 and 21 are respectively sectional views on lines 21—21 and 22—22 of Fig. 20.

Figure 23:
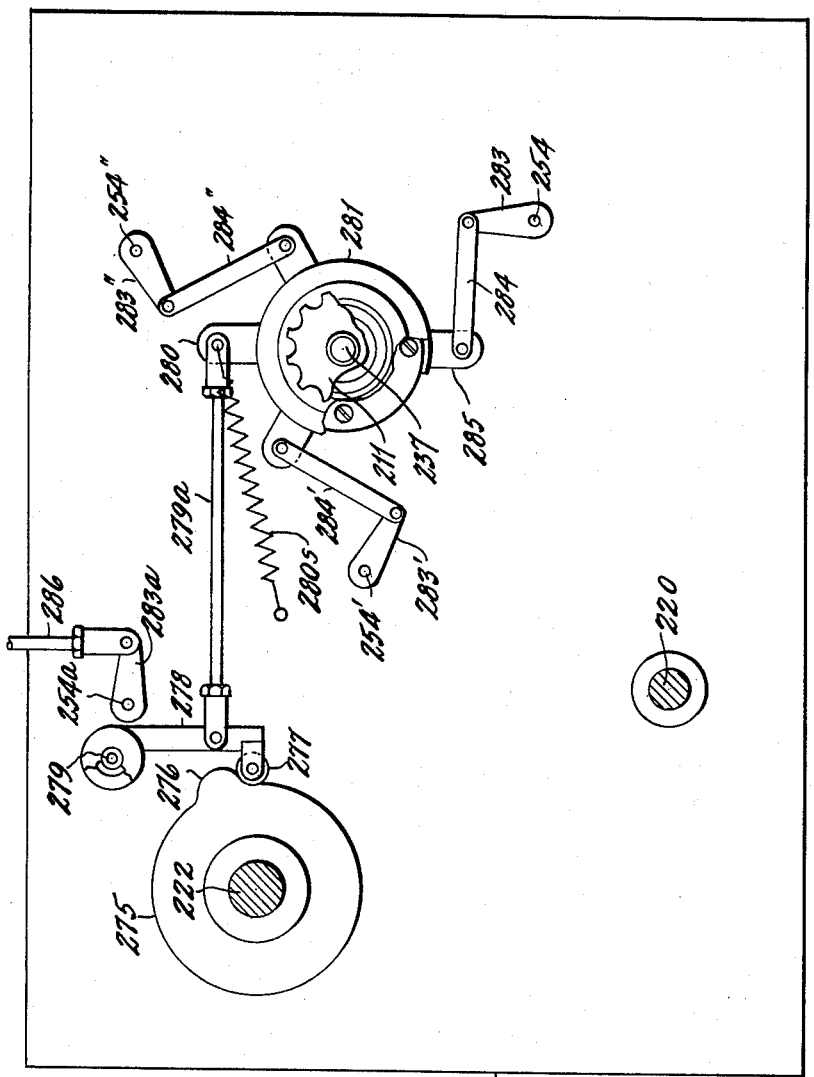

Fig. 23 is a view partly in section on line 23—23 of Fig. 18.

Fig. 24 is a plan view of the machine start and stop mechanism as viewed in the direction of arrow 24 of Fig. 19.

Fig. 25 is a view in the direction of arrow 25 of Fig. 24.

Fig. 26 is a sectional view on line 26—26 of Fig. 24.

Fig. 27 is a perspective view in the direction of arrow 27 of Fig. 16 and shows the apparatus at station 1 for feeding a switch plunger to a workholder.

Fig. 27A is a fragmentary view of a feeler operated switch looking in the direction of arrow 27a of Fig. 27.

Fig. 27B is a view of a feeler operated switch at the station following station 1.

Fig. 27C is a view in the direction of arrow 27c of Fig. 27B.

Fig. 28 is a view showing, diagrammatically, the operation of the switch plunger feeder at station 1.

Fig. 29 is a fragmentary view in the direction of arrow 29 of Fig. 27.

Fig. 30 is a fragmentary view of a portion of Fig. 28 showing certain parts in other positions.

Fig. 31 is a front view of the grease feeder at station 4 of Fig. 16, the part in section being substantially on line 31—31 of Fig. 32.

Figure 33:
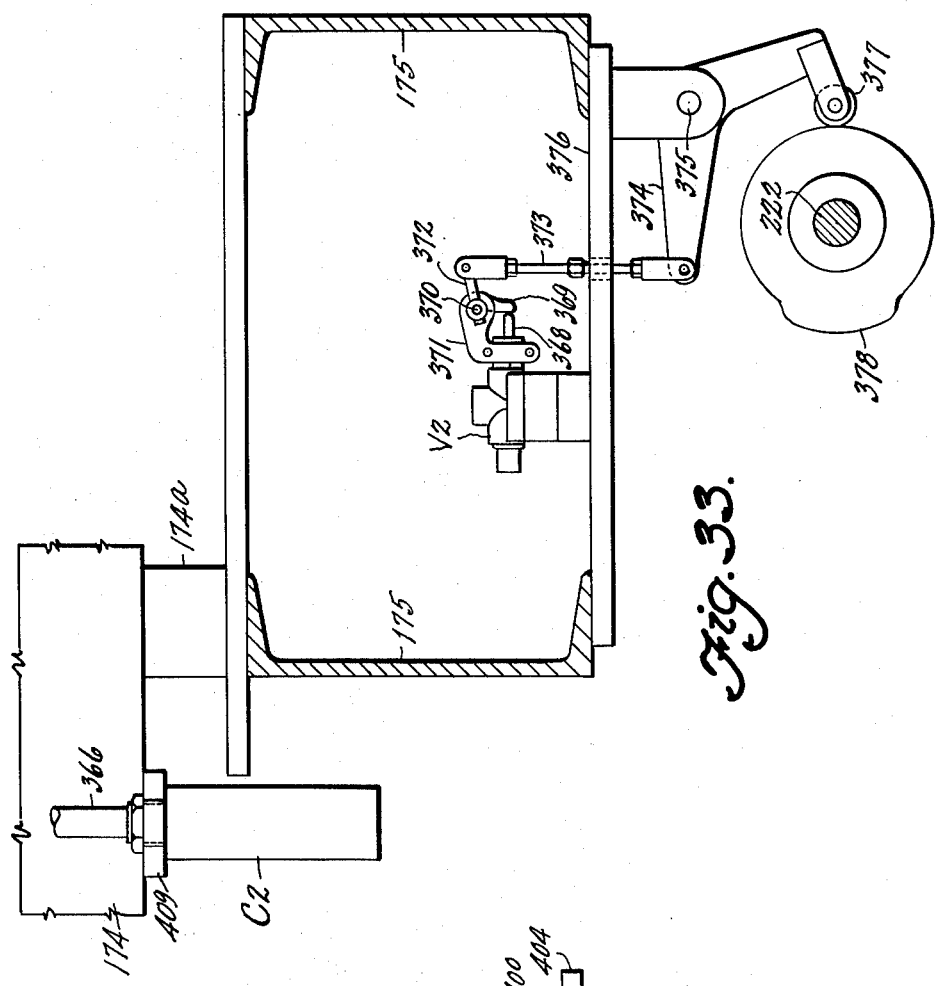

Figs. 32 and 33 together comprise a side view partly in section of the grease feeder, the parts in section being substantially on line 32—32 of Fig. 31.

Figure 34:
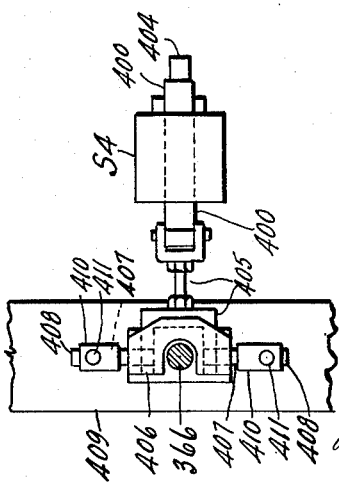

Fig. 34 is a sectional view on line 34—34 of Fig. 32.

Fig. 35 is a diagram of the support feeder at station 6 of Fig. 16.

Fig. 35A is a view in the direction of arrow 35a of Fig. 35.

Fig. 36 is a side view of the switch staker at station 8, Fig. 16.

Fig. 37 is a fragmentary view in the direction of arrow 37 of Fig. 36.

Fig. 38 is a fragmentary view in the direction of arrow 38 of Fig. 37.

Fig. 39 is a fragmentary sectional view on the line 39—39 of Fig. 36.

Fig. 40 which is a continuation of Fig. 36 shows the lower portion of the staker operating mechanism.

Fig. 41 is a view in the direction of arrow 41 of Fig. 40.

Fig. 42 is a view in the direction of arrow 42 of Fig. 40.

Fig. 43 is a sectional view on the line 43—43 of Fig. 42.

Fig. 44 is a side view of the switch tester at station 9 of Fig. 16, the parts in section being substantially on line 44—44 of Fig. 45.

Fig. 45 is a view in the direction of arrow 45 of Fig. 44.

Fig. 45A is an enlarged sectional view on line 45a—45a of Fig. 45.

Fig. 46 is a view in the direction of arrow 46 of Fig. 44.

Fig. 47 which is a continuation of Fig. 44 shows the lower portion of the tester operating mechanism.

Fig. 48 is a view in the direction of arrow 48 of Fig. 47.

Figure 52:
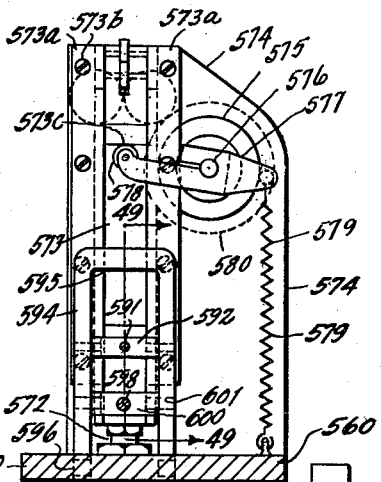
Figure 49:
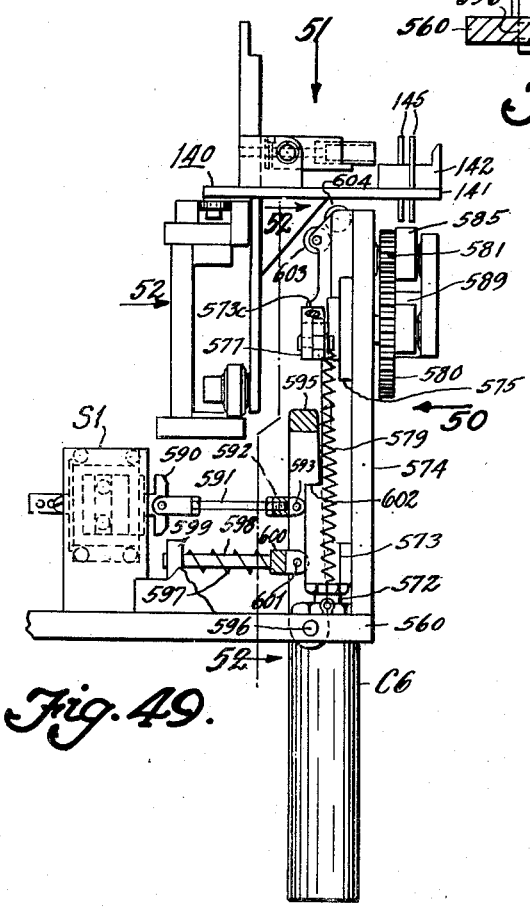

Fig. 49 is a side view of the apparatus located at station 10 of Fig. 16, for indicating the rejection of a switch which does not pass the test at station 9, the part in section being on line 49—49 of Fig. 52.

Figure 51:
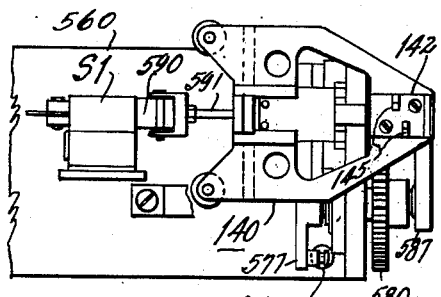
Figure 50:
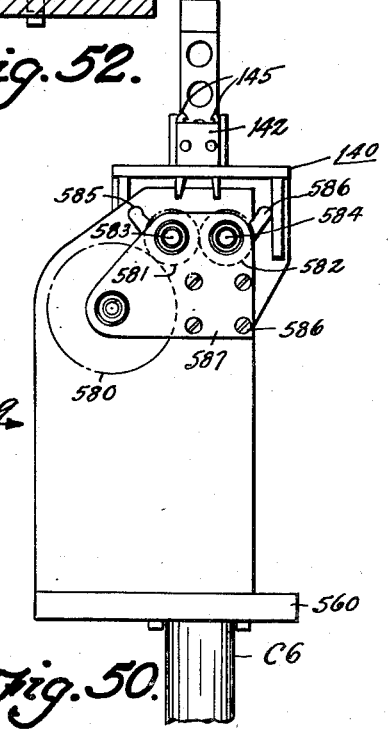

Figs. 50, 51 and 52 are views taken respectively in the direction of arrows 50, 51 and 52 of Fig. 49.

Figure 53:
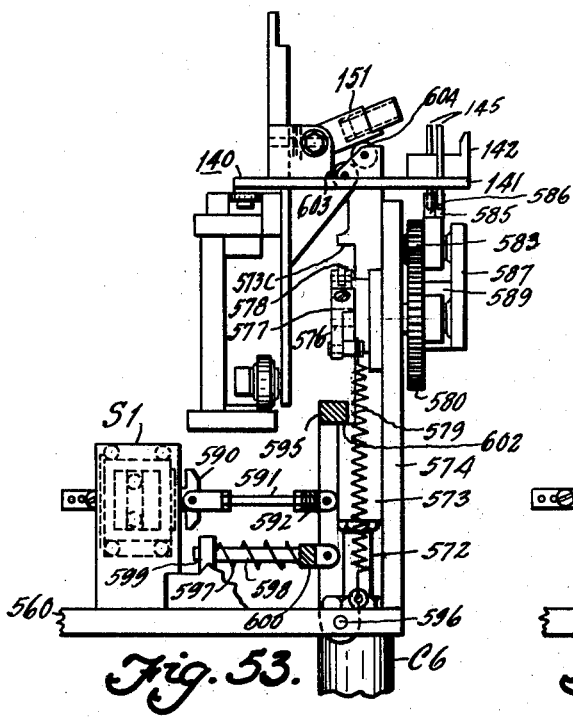
Figure 54:
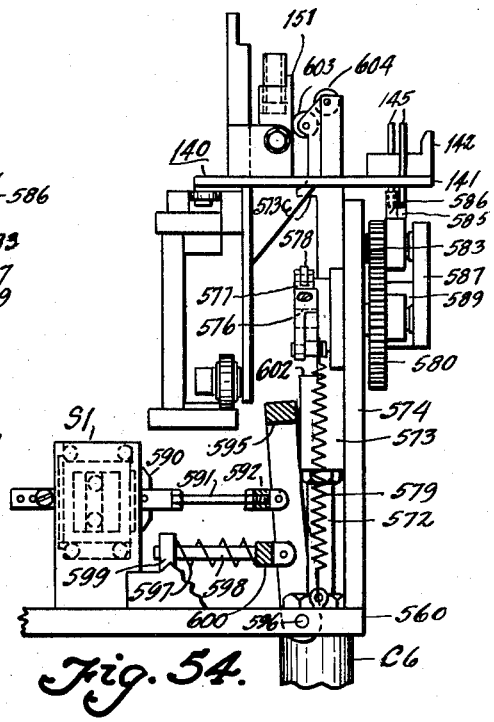

Figs. 53 and 54 are views similar to Fig. 49, showing parts in other positions.

Fig. 54 is a view showing the mechanism for controlling a valve V6 for controlling cylinder C6 of Fig. 49.

Figure 54A:
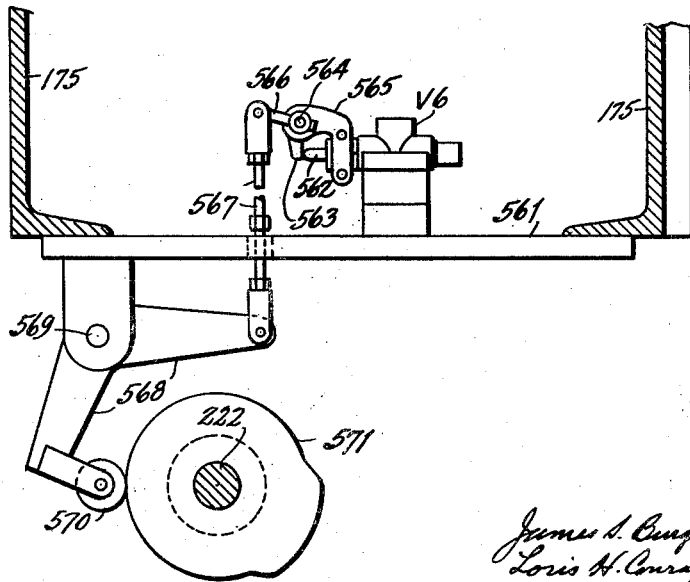

Fig. 54A is a side view of the apparatus located at stations 12 and 13 of Fig. 16 for sensing the presence or absence of a switch in a holder at these stations.

Fig. 55 shows, partly in vertical section, a screw driver located at station 12.

Fig. 55A is a sectional view on line 55A—55A of Fig. 55.

Figure 56:
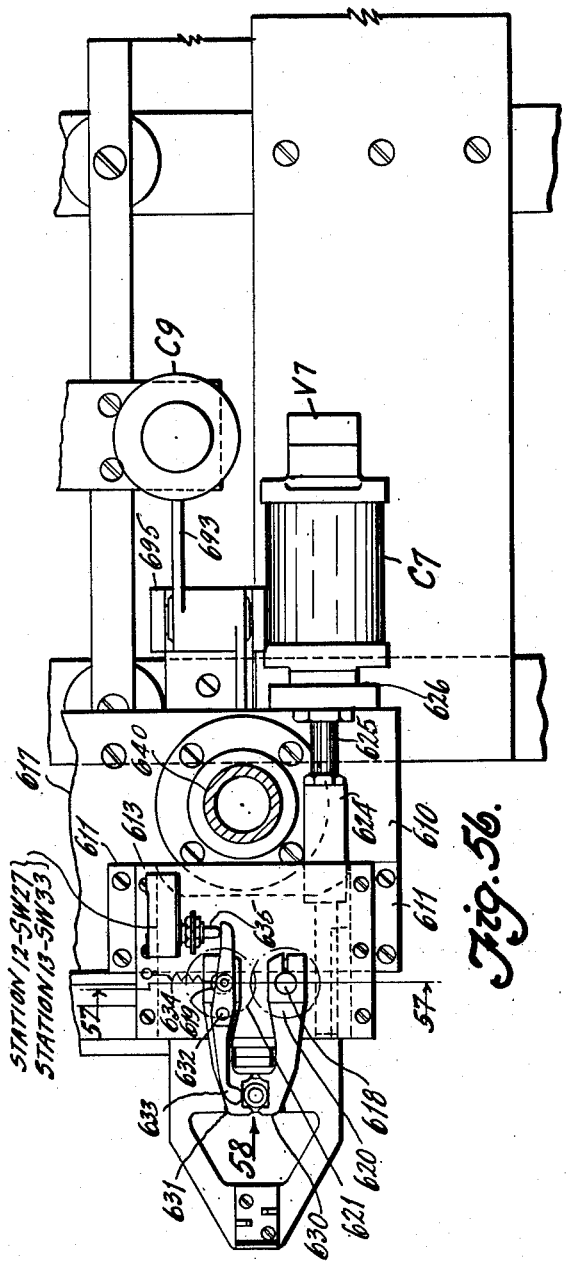

Fig. 56 is a view in the direction of arrow 56 of Fig. 55.

Figure 57:
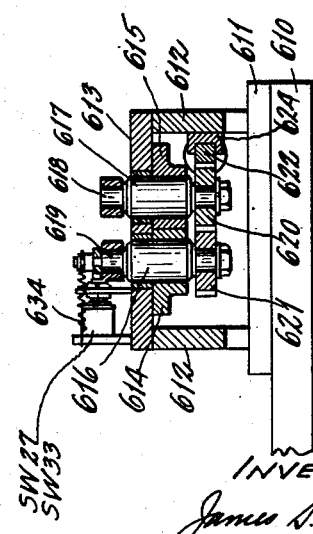

Fig. 57 is a sectional view on line 57—57 of Fig. 56.

Figure 58:
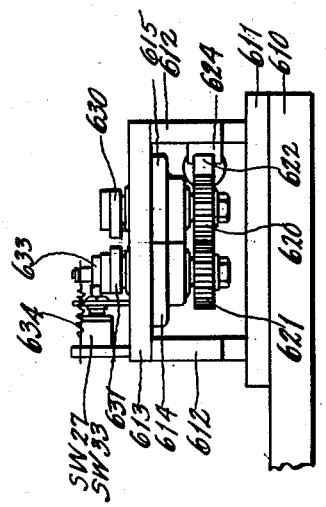

Fig. 58 is a view in the direction of arrow 58 of Fig. 56.

Figs. 59 and 60 are front and side views of a switch unloader at station 14.

Figure 62:
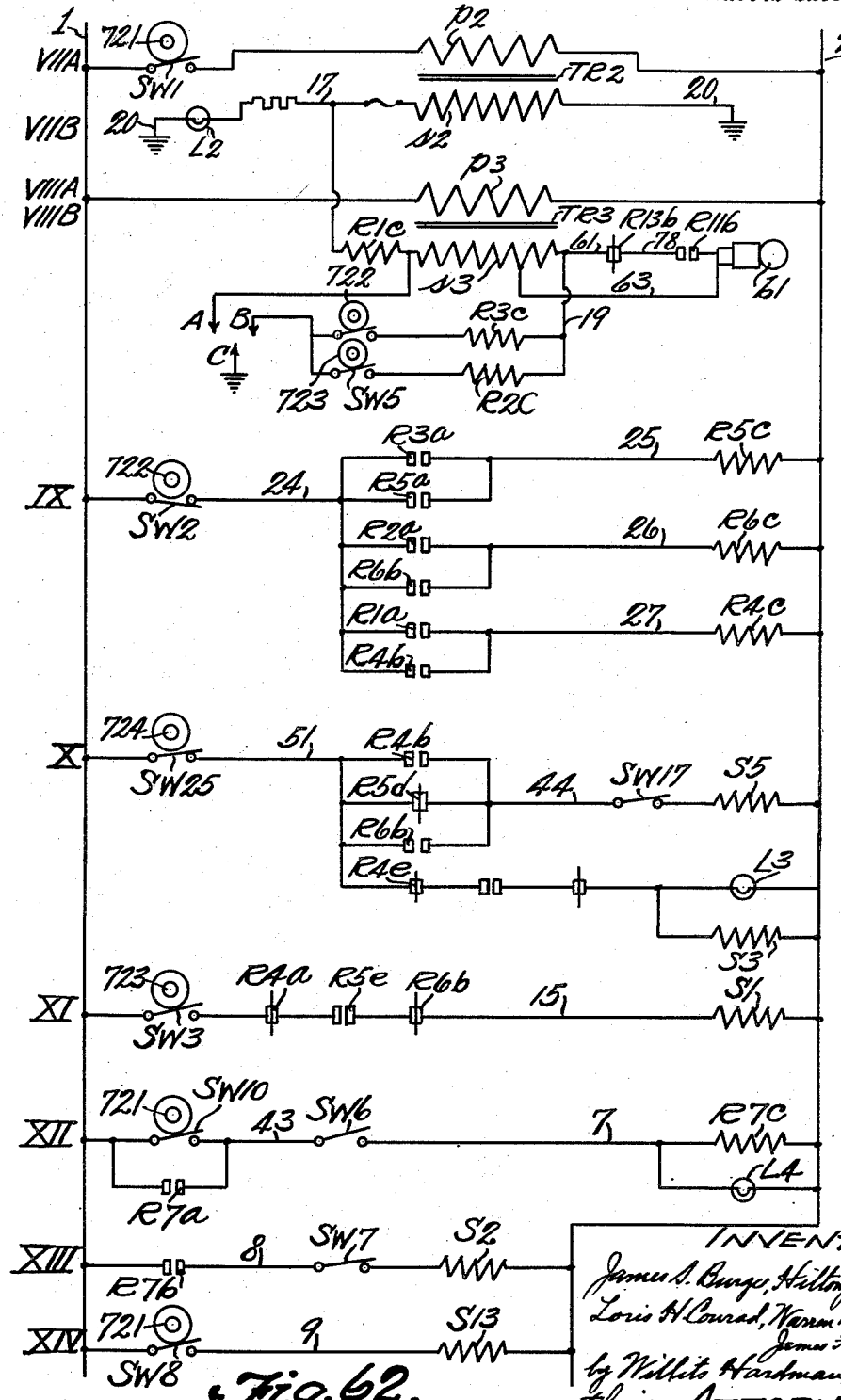
Figure 63:
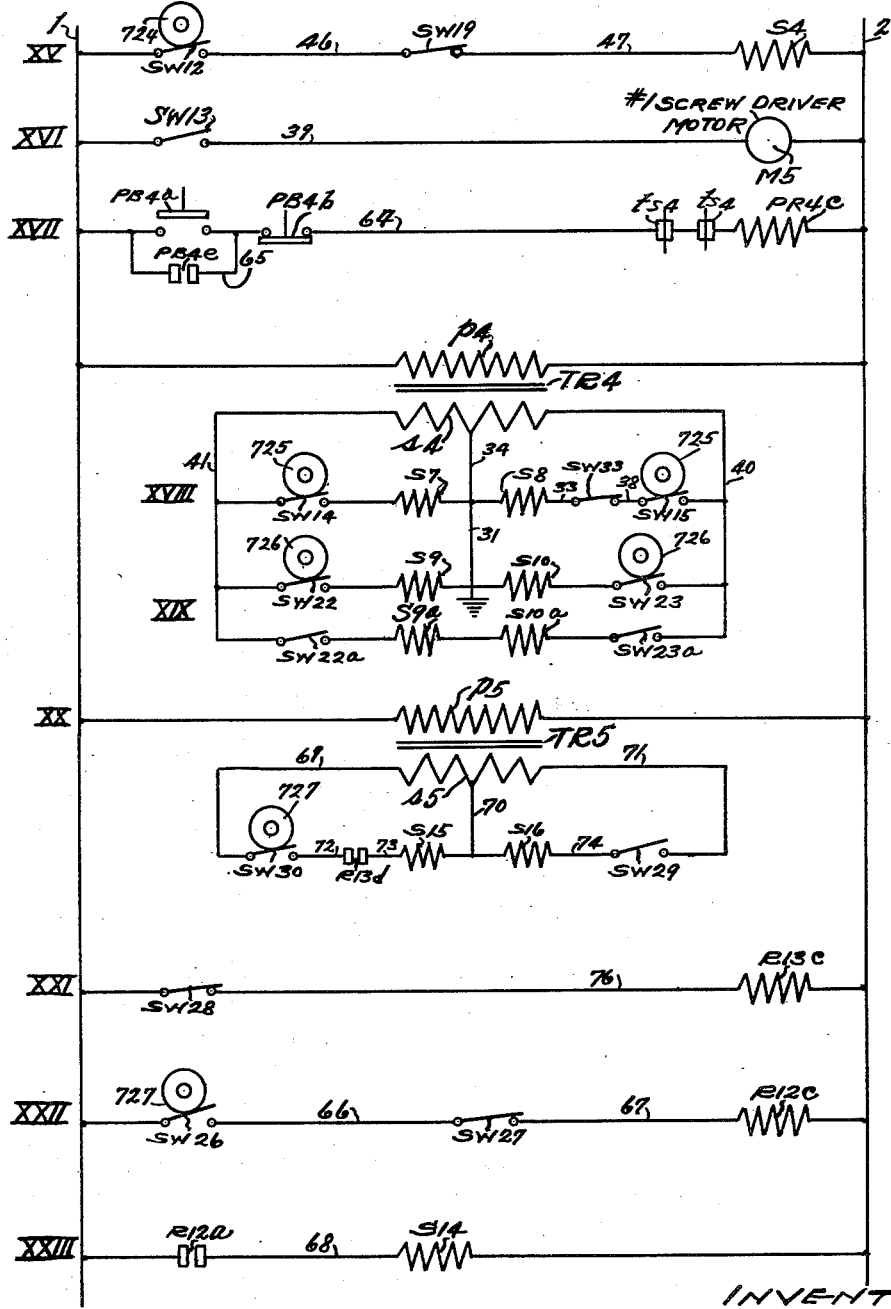

Figs. 61, 62 and 63 constitute a wiring diagram of the electrical controls of the machine.

Figure 64:
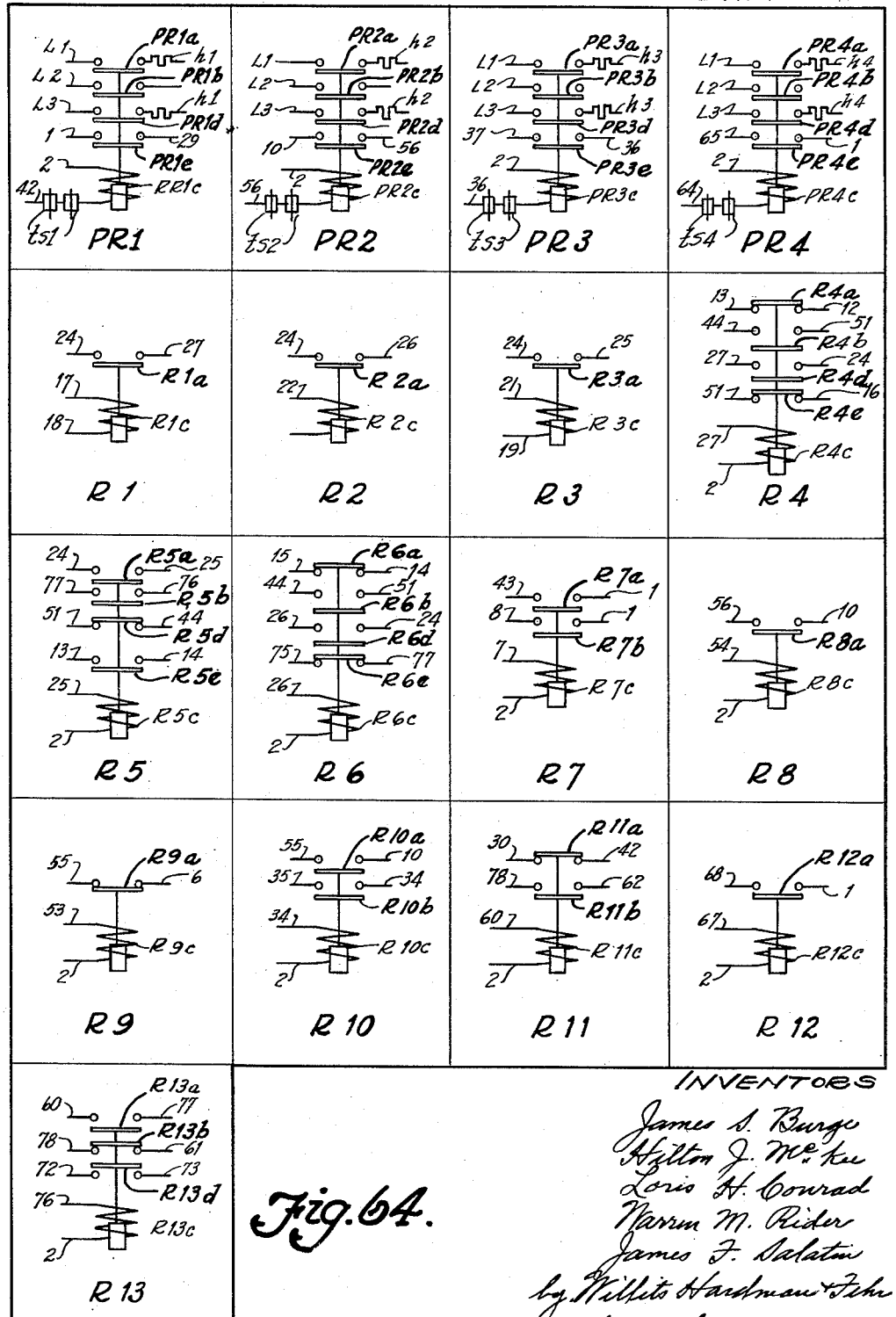

Fig. 64 is a chart of the relay switches included in the wiring diagram of the machine.

Figure 65:
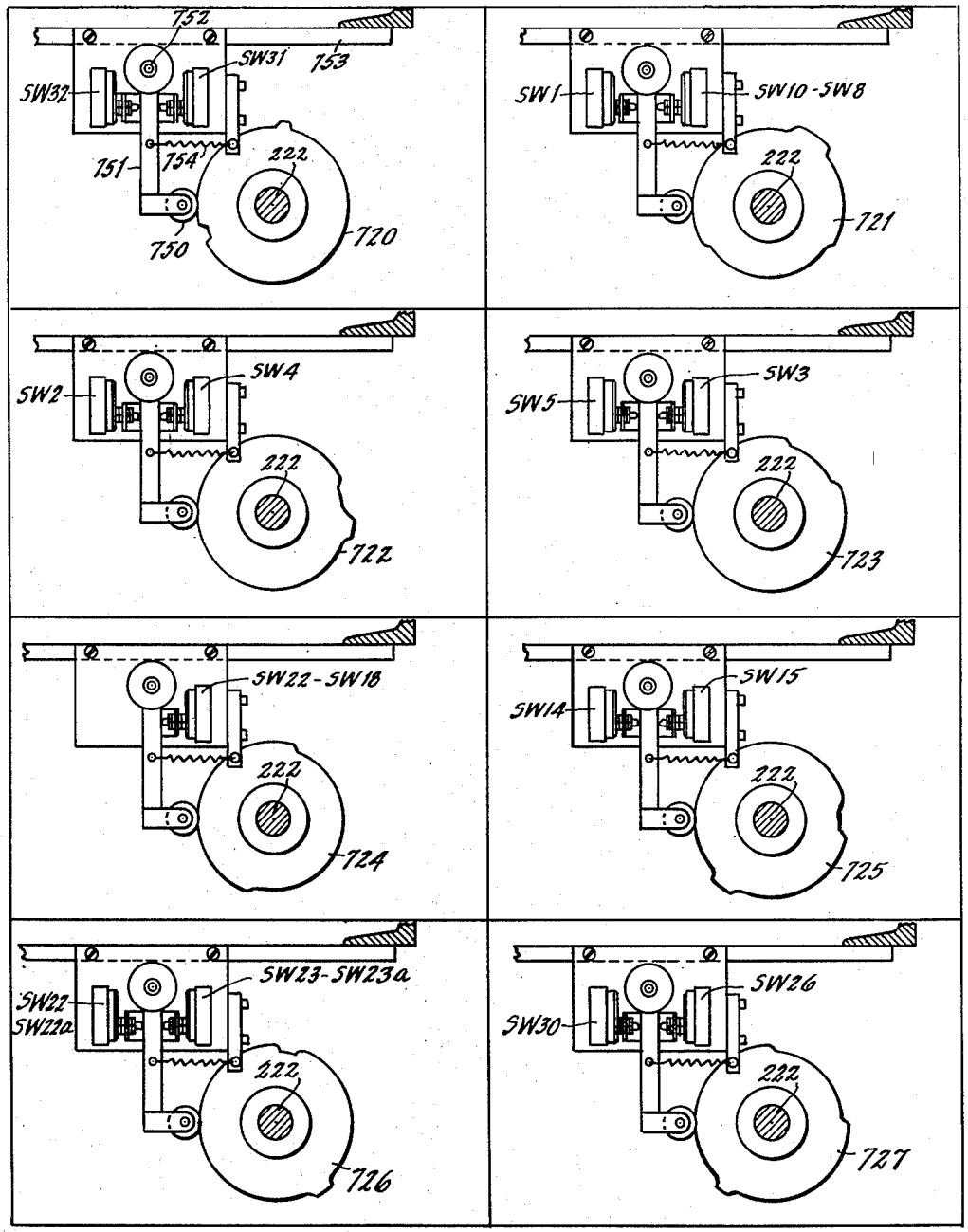

Fig. 65 is a chart of cam operated switches included in the wiring diagram.

Figure 66:
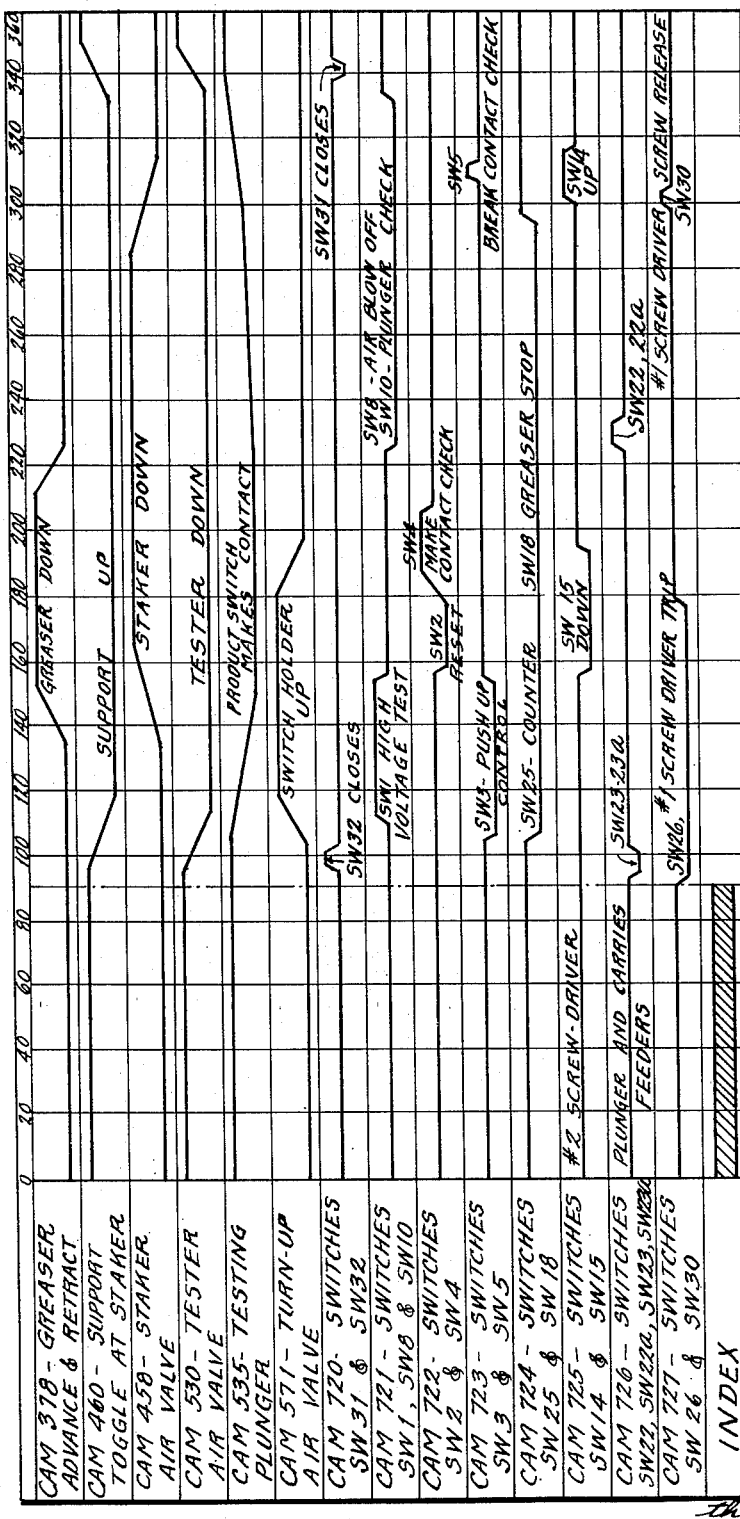

Fig. 66 is a chart showing the function of the various cams.

Referring to Figs. 1 and 2, the product switch assembled and tested by the machine includes a case 100 having tangs 101 which are bent over against a non-conducting cover 102 and which are received by notches in the cover whereby the cover is secured to the case 100. The cover 102 supports terminals 103 and 104 which receive respectively screws 105 and 106, which retain clips 107 and 108. The terminals 103 and 104 are secured to the cover 102 by rivets 109 and 110, the heads of which provide fixed contacts which are bridged by a movable contact 111 when moved to the left from the position shown in Fig. 2. Contact 111 is received by a non-conducting support 112 which has notches 113 for receiving projections 114 of the contact 111. The support 112 is received between tangs 115 of a metal carrier 116 which slides upon the bottom of the switch case 100. A spring 117 urges the contact 111 against the case cover 102 and the carrier 116 against the bottom wall of the switch case 100.

The case 100 provides integral strap 120 which rivets 121 connected with a bracket 122 which includes an internally threaded flange 123 from which extends a lug 124 to be received by a notch in a mounting plate 125, the back or left side of which receives the bracket 122. The front or right side of plate 125 receives the flange 126 of a bushing 127 threaded into the sleeve 123 and providing a guide for a switch operating plunger 130, the left end of which is received within the switch case 100. The left end of the plunger 130 terminates in a disc 131 having a diameter less than that of a slot 132 of the carrier 116 (Fig. 3). The disc 131 extends from a neck 133 of a diameter to be received within a notch 134 of carrier 116 (Fig. 4). The plunger 130 is normally retained in position shown in Fig. 2 by a spring 135 confined under compression between the right wall of the switch case 100 and the shoulder 136 of the plunger. Movement of the plunger 130 toward the switch case 100 causes the contact 111 to bridge the rivets 109 and 110 to make a connection between terminals 103 and 104 of the switch.

*Switch holder*

Referring to Figs. 9 through 15, each switch holder 140 comprises a horizontal plate 141 provided with an opening 141a for receiving a part of a switch unloading apparatus to be described. Plate 141 supports a block 142 for receiving the switch case 100, as shown in Fig. 10. Block 142 supports rods 143 (Fig. 15) in which latches 144 are journaled, said latches having hooks 145 for engaging upper edges of the switch cases when forced down between the latches being urged into case retaining position by spring 146. To the plate 141 are secured plates 147 and 148 and a post 149 which spaces the plates 147 and 148 which provide bearings for a tubular shaft 150 which is secured to a block 151 having bifurcations 152 (Fig. 10) which are forced together around the shaft 150 by screws 153. Block 151 supports a sleeve 154. Block 151 can be latched in horizontal position as shown in Fig. 10 or in vertical position, as shown in full line, by providing the shaft 150 with notches 155 (Fig. 14) spaced 90° and each adapted to receive a ball 156 which a spring 157 urges to the right. Spring 157 is located in a recess in plate 148 and is retained by a plug 158. As shown in Fig. 10, there is a hole 160 which extends through the block 151, shaft 150 and sleeve 154, this hole being in alignment with a hole 161 in post 149 when the block 151 is horizontal. The holes 160 and 161 are to receive a rod which is operated at the test station for the purpose of moving the switch plunger 130.

The holder 140 includes also a vertical plate 162 and braces 163. Plate 162 supports a roller 164 which rests on a rail 165 which supports a spacer 166 engaged by a side of the roller 164. Rail 165 is attached to a plate 167 attached to plates 168 and 169. Plate 169 supports rails 170 and 171 which receive between them two rollers 172 attached to plate 141 of the holder 140.

Figure 12:
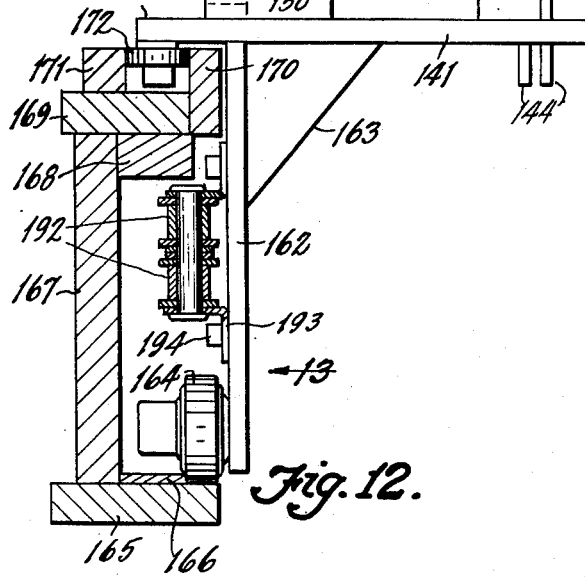
Fig. 12 is a view in the direction of the arrow 12 of Fig. 11, the holder track being shown in section.

As shown in Figs. 16 and 17 there are two, parallel, long track sections $T_1$ and two, parallel, short track sections $T_2$ having rail structures constructed as shown in Figs. 11 and 12. The plate 167 of section $T_1$ is attached to cross-bars 174 supported by channels 175 and spaced therefrom by spacers 174a. Channels 175 are spaced as shown in Fig. 19, between tubes 176 through which there extend tie bolts 177 receiving nuts 178. The channels 175 are supported, in part, by leg frames 179 and, in part, by a plate 180 (Fig. 19) supported by plates 181 and 182 supported by a base plate 183.

Figure 13:
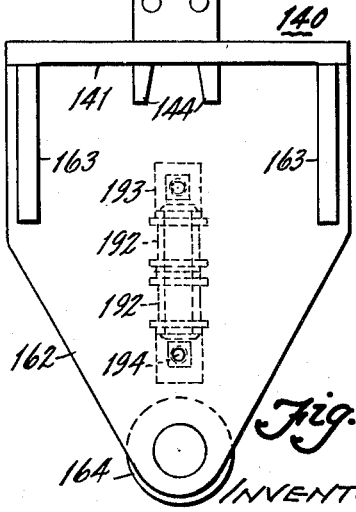
Fig. 13 is a view of the holder in the direction of the arrow 13 in Fig. 12.

Near their left ends (Fig. 16), channels 175 support a plate 184 which supports a track section $T_2$ and bearings 185 for shaft 186 attached to sprockets 187. Near their right ends, channels 175 support a plate 188 which supports a track section $T_2$ and bearings 189 for shafts 190 attached to sprockets 191. Each of sprockets 187, 191 is a double sprocket which receives two chains 192 represented by dot-dash lines in Fig. 17. Chains 192 are attached at intervals to switch holders 140 as shown in Figs. 12 and 13 by clips 193 and screws 194. The path and direction of movement of the switch holders is indicated by lines 195 and 196 and arrow heads thereon in Fig. 16.

Referring to Figs. 18 and 19, a channel 175 supports a box-like structure comprising horizontal plates 184 and 200 and vertical plates 201, 202, 203, 204 and 205. Plate 200 and the bearing 185 support one of the shafts 186 connected with a bevel gear 206 meshing with a bevel gear 207 connected with a shaft 208 journaled in bearings supported by plates 204 and 205 and connected with a sprocket 209 connected by a chain 210 with a sprocket 211. Chain 210 engages also an idle sprocket 212 supported by a bracket 213 attached to plate 180, said bracket being adjustable so as to take up slack in chain 210. By means of a 120° revolution clutch I supported by plate 181 sprocket 211 is connected with a sprocket 214 receiving a chain 215 engaging sprockets 216, 217 and 218. Sprocket 217 is an idle sprocket which can be adjusted to take up slack in the chain 215. Sprocket 218 is connected by a torque limiting clutch 219 (Fig. 18) with a shaft 220 which is the output shaft of a speed reducer 221 driven by electric motor M1. Sprocket 216 is connected through a clutch II with a cam shaft 222 made in separable parts as shown in Fig. 17 and connected by a coupling 223. Shaft 222 is mainly supported by brackets 224 attached to the channels 175. The cams on this shaft are not shown in Fig. 17, but are shown separately with the mechanisms respectively associated with them.

The idle sprockets 191 (Figs. 16 and 17) are connected with a shaft 74 and can be adjusted horizontally to take up the slack in the conveyor chains 192 by adjusting the bearings 189 horizontally on plate 188 in the manner disclosed in the copending application of Burge et al., Serial No. 140,808, filed January 27, 1950.

Idle sprocket 217 is journalled on a stud 230 attached to a lever 231 pivoted on a screw 234 attached to plate 181 and having a slot 233 which receives the screw 234 which receives a washer 235 and which is threaded into plate 181. By turning the lever 231, slack in chain 215 can be taken up and the lever fixed in adjusted position by tightening the screw 234.

Sprocket 211 (Figs. 18 and 21) is attached to a shaft 237 journaled in bearings 238 (Fig. 21) supported by a bracket 239 attached to the plate 181. Shaft 237 is connectible with the sprocket 214 through the one-third revolution clutch I (Fig. 20). Sprocket 214 is attached to a disc 236 (Figs. 20 and 21) journaled loosely on the reduced portion 237a of shaft 237 which is supported also by a bearing 240 supported by a bracket 241 attached to plate 181. Disc 236 has notches 242 (Fig. 20) each adapted to receive a lug 244 of a lever 245 journaled on a pin 246 carried by a disc 247 connected with shaft 237. Disc 247 has a notch 248 for receiving a locking pawl 249 pivoted on a pin 250 attached to plate 181. Pin 250 supports also a pawl 251 having a notch 252 for receiving a latch pawl 253 attached to a shaft 254. The pawls 249 and 251 are urged respectively clockwise and counterclockwise by a spring 255 which surrounds a rod 256 pivoted on a pin 257 attached to pawl 251 and passing through a block 258 swiveled on pawl 249 by means of a stud 259 integral with the block and receiving a retaining nut 260. The expansion of spring 255 is limited by nuts 261 threaded on rod 256 and engageable with the block 258. As shown in Fig. 20, the spring 255 urges the pawl 251 toward the pawl 253 and urges the pawl 249 into the notch 248 of disc 247. Disc 247 which rotates counterclockwise, carries with it a pin 262 supporting a roller 263 which has engaged the pawl 251 and has moved it into the position shown so that the pawl 253 will retain it and the spring 255 has pushed the pawl 249 counterclockwise so that it engages the periphery of the disc 247 ahead of the instant when the notch 248 becomes aligned with the end of the pawl 249 so that the pawl then locks the disc 247. In order that the disc 247 and the shaft 237 are rotated one-third revolution, there are three locking pawls 249 and parts associated therewith, the others being marked 249' and 249" and the associated parts are similarly marked. The three latch pawls 253, 253' 253" are rotated clockwise simultaneously by means to be described. Therefore, the pawl, such as 253, which had been latching a pawl 251, will release said pawl so that a spring 265, which connects pin 257 with a pin 266 attached to plate 181, will release pawl 249 thereby permitting a spring 267 which connects lever 245 with a pin 268 of disc 247 to move lever 245 counterclockwise to cause its lug 244 to be received by a notch 242 in disc 236 when pawl 249 has been retracted from the notch 248. Then the driving element 236 of the clutch I will rotate the disc 247 and the shaft 237 thereby causing it to be rotated 120° counterclockwise in Fig. 20. Before the end of this movement, the roller 263 will engage pawl 251' to place it in a position relative to disc 247 which is the same as pawl 251 had previously taken as shown in Fig. 20. It is therefore apparent that each time the three pawls 253, 253' and 253" are rotated clockwise (Fig. 20) the clutch will be tripped and engaged and will automatically disengage at the end of one-third revolution. As viewed in Fig. 18, sprocket 211 rotates counterclockwise and causes, through the mechanism shown, counterclockwise rotation (Fig. 16) of sprockets 187 and 191 so that the runs of the conveyor chains 192 appearing lower in Fig. 16 move toward the right and the runs appearing upper in Fig. 16 move to the left. During each one-third revolution of shaft 237, the conveyor chains 192 move a distance equal to the center-line spacing of the workholders 140 attached thereto.

Sprocket 216 is connected with cam shaft 222 by a clutch II constructed like clutch I except that it has only one locking pawl 253a on a shaft 254a. (Parts of clutch I, like parts of clutch II, are marked with the same reference numbers with "a" affixed.) Therefore clutch II is a one-revolution clutch. As shown in Fig. 22, shaft 222 has a reduced portion 222a which is supported by a bearing 270 in a bracket 271 attached to plate 181. Shaft 222 is journaled in a bearing 272 in plate 181 and by other bearings 273 (Fig. 17) supported by brackets 224.

In Fig. 23, shaft 222 rotates clockwise a cam 275 having a lobe 276 for engaging a roller 277 carried by a lever 278 pivoted at 279 on plate 181 and connected by a link 279a with an arm 280 extending from a hub 281 which, as shown in Fig. 21, is journaled on a needle-bearing 282 supported by the sleeve 239. Hub 281 is connected with pawl shafts 254, 254' and 254" through levers 283, 283' and 283", links 284, 284' and 284" and arms 285, 285' and 285", respectively, extending from the hub 281. A spring 280s, urges the hub 281 counterclockwise and the roller 277 against the cam 275. Engagement of the lobe 276 with roller 277 causes the shafts 254, 254' and 254" to rotate counterclockwise in Fig. 23 and clockwise in Fig. 20. Therefore, once during a revolution of shaft 222, the clutch I is tripped by momentary retraction of the pawls 253, 253' and 253". The tripping of clutch II is effected by a momentary clockwise (Fig. 20) movement of pawl 253a which is attached to a shaft 254a which, as shown in Fig. 23, is connected with a lever 283a connected with a link 286 which, as shown in Fig. 25, is connected with a bell crank lever 287 pivotally supported at 288 on a vertical plate 289 supported by a horizontal plate 290. A spring 291 urges lever 287 counterclockwise. Lever 287 has a pin 292 received in a slot 292a of a link 293 connected with a lever 294 attached to a shaft 295 from which there extends a control handle 296. When handle 296 is moved from "stop" position (Fig. 18) counterclockwise to "start" position, link 293 moves left, lever 287 clockwise, link 286 up, shaft 254a counterclockwise in Fig. 23 and clockwise in Fig. 20 to trip the clutch II.

Shaft 295 carries a lever 300 (Fig. 24) connected by a link 301 with the armature 302 of a solenoid S2 which, when energized in a manner to be described, will move control handle 296 from "start" position to "stop" position, thereby causing the clutch II to disengage and to disconnect motor M1 from the cam shaft 222 and the machine stops in home position.

In the stop position of handle 296, a plate 305 attached to shaft 295 and stopping against a fixed pin 306 has pushed the plunger of a switch SW7 to open it.

*Plunger feeder—Station 1*

At station 1, a plunger 130 is fed into the sleeve 154 of block 151 when vertical. Fig. 27 shows a hopper-feed comprising a hopper 310 which is rotated by a motor M2 which drives the hopper through a speed reducer contained in a housing 312 which supports motor M2 which is supported by a bracket 313. The hopper feed, which is a purchased equipment, has a chute 314 into the upper end of which plungers 130 are caused to enter large end down. The lower end of chute 314 is supported by a bracket 315 (Fig. 28) which supports a hinge pin 316 pivotally supporting a hinge plate 317 attached to a chute outlet 318 located at 318' in Figs. 27 and 28 during indexing of the holders 140. Plungers 130 in chute 314 descend therein until the lowermost one is caught by a pin 319 (Fig. 30) fixed to a spring blade 320 supported by a block 321 attached to the chute. Block 321 supports a pin 322 which supports a lever 323 having a cam 324 for engaging blade 320 to move it from the position shown in Fig. 30 to the position shown in Fig. 28 to lift the pin 319 from the lowermost plunger 130 so that it may gravitate to position 130' within the sleeve 154, said plunger 130 having been guided to the sleeve 154 by chute outlet 318 when in the full-line position shown in Fig. 27. Lever 323 has a cam 325 for engaging a spring blade 326 carrying a pin 327 and attached to the block 321. When lever 323 moves from the position shown in Fig. 30 to that shown in Figs. 28 and 29, blade 320 moves up to release a plunger 130 and blade 326 moves down so that its pin 327 will be engaged by the lowermost plunger 130 left in chute 314 as shown in Fig. 28. Lever 323 is connected by a link 330 with a lever 331 connected with hinge plate 317 so that, as lever 323 moves from position 323' (Figs. 28 and 30) to position 323 in Figs. 28 and 29, link 330 moves from 330', lever 331 from 331' and chute outlet from 318' to 318 in Fig. 28 to guide the released plunger 130 into the sleeve 154.

Lever 323 is connected by a link 333 with a coupling 334 connected by a rod 335 with a piston in a cylinder C1 into which compressed air is admitted by a valve V1 controlled by solenoids S9 and S10 under control by switches SW22 and SW23 to be described. When solenoid S9 is energized, valve V1 is conditioned for up movement of rod 335. When solenoid S10 is energized, valve V1 is conditioned for down movement of rod 335.

Motor M2 is caused to run when plungers 130 are required in the chute 314. The control of motor M2 includes switches SW20 and SW21. Switch SW20 is closed by down movement of rod 335 which causes a rod 336 extending from coupling 334 to engage a button 337 of this switch. Switch SW20 opens during up movement of rod 335. Switch SW21 normally connects blades 52b and 53b connected respectively with wires 52 and 53. Switch SW21 is located in a case 21a supporting a switch button 21b. A bracket 340 supports case 21a and guides a rod 341 engageable with button 21b. Rod 341 has a collar 342 which receives the lower end of a spring 343 surrounding the rod and abutting a washer 344 which receives the rod 341, said rod extending through a hole 345 in lever 323 and being connected by a pin 346 with a lever 347 pivoted on a pin 348 supported by the chute 314 and having a finger 349 for engaging a plunger 130, if one is present adjacent the finger when lever 347 is moved clockwise against the action of a return spring 350. If, when rod 335 moves down to effect location of chute outlet 318 as shown in full line in Fig. 28 and the release of a plunger 130, there is no plunger 130 adjacent to the finger 350, lever 323 will push (through spring 343) the rod 341 downwardly to cause button 21b to move down to effect electrical disconnection of blade 53b and blade 52b and electrical connection of blade 52b with a blade 54b connected with a wire 54. By a control circuit to be described, motor M2 is connected with a current source and operates to cause the hopper-feed to feed more plungers 130 into the chute 314. If there had been a plunger 130 adjacent the finger 349, when rod 335 moved down, switch SW21 would not have been operated to switch connections of blade 52b from blade 53b to blade 54b and the motor M2 would not have been caused to operate. It is desired to withhold operation of motor M2 when not required to fill the chute 314 up to the finger 349 so that the plungers 130 will not be tumbled by the hopper feed any longer than necessary. This arrangement reduces the likelihood of removing chromium plating from the plungers while they are in the hopper feed.

*Long spring assembly*

The spring 135 is assembled as shown in Fig. 9 at station 2.

*Switch case assembly*

The case 100 is assembled at station 3 by placing the bracket sleeve 123 around the sleeve 154 of block 151 and moving the case, the sleeve 154 and the block 151 into inclined position as shown in Fig. 9 so as to facilitate registering to lug 124 for reception by a notch 125a of block 151 and pushing the case toward the block 151 until the bracket sleeve 123 engages the block. As the case 100 and the block 151 are moved into horizontal position shown in Fig. 10, the left wall of the case may engage bevelled surfaces 142a of lugs 142b of block 142 so that the case is cammed to the right against the opposition of spring 135. As the case 100 approaches the block 142, it engages bevelled surfaces 145a of hooks 145 (Fig. 15) to spread the latch levers 144 until just before the case 100 is seated upon the block 145. The spring 146 restores the levers 144 to normal position with the hooks 145 spaced above the upper edges of the case 100 a distance slightly greater than the thickness of the cover 102 (Fig. 2) to be assembled later.

*Grease feeder—Station 4*

Referring to Figs. 31–34, a bar 174a supported by channels 175 supports plates 360 which support a plate 361 which supports a guide 362 for a vertically movable rod 363 carrying a key 364 received by a slot 365 in guide 362 so that the rod 363 does not turn. Rod 363 is actuated vertically by compressed air servo device or air motor comprising a cylinder C2 containing a piston connected with a rod 366 the upper end of which is screwed into rod 363 and is prevented from turning by a lock nut 367. The admission of compressed air into the ends of cylinder C2 is controlled by a valve V2 (Fig. 33) having an actuating plunger 368 urged right by a spring in the valve V2 and engageable by a lever 369 on a shaft 370 supported by a bracket 371 supported by valve V2. Shaft 370 carries a lever 372 which a link 373 connects with a lever 374 pivoted at 375 on a bracket 376 supported by channels 175 and carrying a roller 377 for engaging a cam 378 rotated by the shaft 222.

Rod 363 supports a bracket 380 supporting a grease container 381 closed by a cover 382 and having a nipple 383 supported by a coupling 384 supported by the container. If the holder 140 contains a switch case 100, the rod 363 will be caused to descend at the proper time to cause the nipple 383 to touch the bottom of the case 100 and the container will descend slightly further to cause movement of the coupling 384 relative to the nipple 383 so that grease will be expelled upon the case 100 against which the nipple is pressed.

The greaser does not operate unless a switch case 100 is upon the holder 140 to detect the presence of a case on the holder. The case is engaged by a feeler lever 390 attached to a shaft 391 journaled in a bearing provided by bracket 392 which supports a switch SW19. Shaft 391 carries an arm 393 connected by a spring 394 with an eye 395 attached to bracket 392. Spring 394 urges lever 390 clockwise to move clockwise a lever 396 attached to shaft 391 thereby opening switch SW19 when a case is not present on the holder. If the switch case is present lever 390 is moved counterclockwise into a position such that switch SW19 closes and a circuit is established so that a certain time to effect energization of solenoid S4 (Fig. 32) to effect right movement of an armature 400 against the action of a spring 401 attached to an eye 402 supported by a block 403 which supports the solenoid S4 and attached to a lever 404 engaging the armature 400. Armature 400 is connected by a link 405 with a yoke 406 pivoted on pins 407 retained in recesses 408 of the plate 409 which support cylinders by plates 410 and screws 411. Therefore when solenoid S4 is energized the stop yoke 406 is moved clockwise (Fig. 32) about the pins 407 away from the path of movement of the nut 367 so that the greasing operation can be performed. If no switch case is present on the holder solenoid S4 is not energized and the stop yoke 406 remains in position shown in Fig. 32 to prevent operation of the greaser.

*Assembly of the switch contact carrier support—Station 5*

The switch contact carrier support 116 is assembled manually by inserting the support bottom side down and tangs 115 uppermost. The disc 131 (Fig. 2) of plunger 130 is received by the notch 132 and the neck 133 is received by the notch 134, the neck 133 being spaced to the left of the right wall of the case 120 as shown in Fig. 10 due to the fact that the lugs 142b of block 142 of the switch holder hold the case in such position as to compress the spring 135 so that the plunger neck 133 will extend to the left of the right wall of the switch case.

Assembly of the switch contact support—Station 6

Referring to Figs. 35 and 35A the switch contact support 112 (Figs. 2 and 5) are fed from a hopper feed similar to that used for feeding plungers. The support hopper feed is operated by motor M3 (wiring diagram Fig. 61). The inserts descend as shown in Fig. 35 down a chute 415 supported at its lower end by a bracket 416 which supports a hinged pin 417 pivotally supported by a hinge plate 418 attached to a chute extension 419 which ends in at curved rod 420 attached to part 419 by a bracket 420a to the right of an opening 421 through which the insert descends to the position 112' upon the contact carrier 116. The carriers 112 are fed singly in from the chute 415 by mechanism like that used for feeding plungers. This mechanism comprises spring blades 422 and 423 attached to a block 424 supported by the chute 415 and carrying pins 426 and 427 respectively. Block 424 supports a rod 428 carrying a lever 429 providing cams 430 and 431 for engaging respectively the blades 422 and 423. Lever 429 is connected by a link 432 with a lever 433 connected with plate 418. When lever 429 is in position 429', link 432, lever 433 and chute outlet 419 are in position 432', 433' and 419. Movement of lever 429 from position 429' to the full line position causes pin 427 to release the lowermost support 112 in chute 415 and pin 426 to engage the remaining lowermost support 112, and this movement of lever 429 causes the chute outlet to move from 419' to 419 to a position for guiding the released insert 112 to the position 112'. Lever 429 is actuated by an air servo device or air motor comprising a cylinder C3 containing a piston connected by a rod 435, a clevis 436 and a link 437 with lever 429. The admission of compressed air to the ends of cylinder C3 is controlled by a valve V3 which is conditioned by energization of a solenoid S10a for down movement of rod 435 and is conditioned by energization of a solenoid S9a for up movement of rod 435. Solenoid S9a and S10a are controlled by switches SW22 and SW23, respectively, in a manner to be described.

Assembly of contact spring, contact and case cover

At station 7A (Fig. 16) the contact spring 117 (Fig. 2) is assembled and between station 7B and 7C the contact 111 and the cover 102 are assembled.

Staking the case to the cover—Station 8

Referring to Figs. 36 through 43, cross bars 74 support a plate 440 which supports brackets 441 which support a plate 443 which supports a cylinder C4 controlled by a valve V4 having an operating rod 444 engageable by a lever 445 carried by a shaft 446 pivotally supported by a bracket 447 attached to the valve V4. Shaft 446 carries an arm 448 connected by a link 449 with a lever 450 attached to a shaft 451 pivotally supported by bearing brackets 452 attached to brackets 441. Lever 450 is connected by a link 453 with a lever 454 (Fig. 40) pivoted at 455 on a bracket 456 supported by the channels 175. Lever 454 carries a roller 457 for engaging a cam 458 driven by shaft 222. A spring 459 (Fig. 36) urges lever 450 clockwise and lever 454 counterclockwise to cause the roller 457 to follow the cam 458.

Shaft 222 drives a cam 460 for engaging a roller 461 connected by lever 462 pivoted at 463 on bracket 456 and connected with a lever 464 which a spring 465 urges clockwise to cause roller 461 to follow cam 460. Lever 464 is connected by a link 466 with a pin 467 providing a pivotal connection between toggle levers 468 and 469. Lever 468 is connected by a pin 470 with a clevis 471 on the end of a screw 472 threaded through plate 473 and receiving nuts 474 providing for vertical adjustment of the screw 472. Plate 473 forms part of a mounting bracket including a mounting plate 475 attached to a channel 175 and supporting a vertical plate 476 to which screws 477 attach rails 478 for guiding a vertically movable block 479 connected by a pin 480 with link 469. When the lower land of the cam 460 is located adjacent to the roller 461 spring 465 becomes operative to straighten the toggle links 468 and 469 to cause the block 479 to rise to a position to engage and support the horizontal plate 141 of the carrier 140 so that the switch case will be properly supported during the operation of bending its tangs 101 (Figs. 1 and 2) upon the upper surface of the switch case 102.

Referring to Figs. 36 to 39 the air cylinder C4 contains a piston connected with a rod 485 connected by a screw 486 with a block 487 supporting pilot bushings 488 which receive pilot pins 489 supported by plate 443. Block 487 has a recess 490 receiving rolls 491 journaled on rods 492 supported by block 487. Pressure is transmitted from block 487 through the rolls 491 to a floating die 493 having prongs 494 for engaging the sides of the case tangs 101 as they project upwardly as shown in Fig. 10. The function of the prongs 494 is to initiate the bending of the tangs and the completion of the bending is formed by the surface 495. The die 493 extends through a rectangular opening 496 in a plate 497 which screws 498 attach to the block 487. Since there is clearance between the die 493 and the sides of the hole 496 in plate 497 the die may shift laterally in order to accommodate itself to the location of the tangs 101 of the switch case.

Switch testing station 9

Referring to Figs. 44 through 48, the switch testing apparatus comprises a test head 500 which is supported on the heads of three screws 501 extending from a plate 502 and urged downwardly by springs 503 surrounding these screws. The head 500 supports two electrodes 504 and 505 which are respectively engaged by the switch terminals 107 and 108. The head 500 supports a contact 506 for engaging the switch case. The contacts 504, 505 and 506 are connected with wires (to be described) which are enclosed by a flexible cable 510.

The plate 500 is connected with a rod 511 connected with a piston in a cylinder C5 supported by a plate 512 supported by bracket 513 supported by cross bars 74. Bracket 513 supports a bushing 514 which supports cable 510. Plate 512 carries a pilot pin 516 extending through a pilot bushing 517 provided by plate 502. Cylinder C5 is controlled by a valve V5 (Fig. 47) having an operating rod 520 engageable by a lever 521 carried by a shaft 522 journaled in a bracket 523 attached to valve V5 and carrying an arm 524 connected by link 525 with a lever 526 pivoted at 527 on a bracket 528 supported by channels 175. Lever 526 carries a roller 529 for engaging a cam 530 driven by shaft 222. A spring in valve V5 urges rod 520 to the right thereby causing roller 529 to follow cam 530.

Cam 222 drives a cam 535 engaged by a roller 536 carried by a lever 537 pivoted at 538 on bracket 528 and urged upwardly by a spring 539 so that the roller 536 follows the cam 535. Lever 537 is connected by a link 540 connected with a lever 541 pivoted at 542 on a plate 543 supported by channels 175. As shown in Fig. 44, lever 541 has a fork 544, the arms of which carry pins 545 supporting rolls 546 received by a groove 547 of a rod 548 guided for horizontal movement by a sleeve 549 attached to bracket 513. Rod 548 has a reduced portion 550 which is adapted to extend through the holes 161 and 160 which are provided by the workholder parts as shown in Fig. 45A. When the lower land of the cam 530 (Fig. 47) moves adjacent the roller 536 the spring 539 is effective to cause left movement of rod 550 which moves through the holes 161 and 160 (Fig. 45A) to effect movement of the switch plunger 130 to cause the switch to close and to open.

Detection of defective switch—Station 10

Referring to Figs. 51 through 54A, a channel supported plate 560 supports an air cylinder C6 (Figs. 49 and 50)

under control by a valve V6 (Fig. 54A) supported by a bracket 561 supported by channels 175. Valve V6 has an operating rod 562 engageable by a lever 563 carried by a shaft 564 pivotally supported by bracket 565 supported by valve V6. Shaft 564 carries an arm 566 which a link 567 connects with a lever 568 pivoted at 569 on bracket 561 and carries a roller 570 for engaging a cam 571 driven by shaft 222. A spring in valve V6 urges rod 562 to the left to cause roller 570 to follow cam 571.

Cylinder C6 contains a piston connected by a rod 572 with a slide 573 which is guided for vertical movement by rails 573a (Fig. 52) which screws 573b attach to a vertical plate 574 supported by plate 560. Plate 574 supports a bearing 575 for a shaft 576 attached to a lever 577 carrying a roller 578 urged toward a lug 573c of slide 573 by a spring 579 connecting lever 577 with plate 560. Shaft 576 is connected with a gear 580 meshing with a gear 581 meshing with a gear 582. Gears 581 and 582 are attached to shafts 583 and 584 respectively attached to levers 585 and 586 respectively. Shafts 583 and 584 are journalled in bearings provided by plate 574 and a plate 587 which screws 588 attach to plate 574 with a spacer 589 between. As slide 573 moves up, spring 579 rotates lever 577 clockwise (Fig. 52) to rotate gears 580 and 582 counterclockwise in Fig. 50 and gear 581 clockwise to cause levers 585 and 586 to engage the latch levers 144 to move the lower ends thereof toward each other to effect retraction of the hooks 145 from the switch case cover so that the product switch is released from the block 142.

Plate 560 supports a solenoid S1 having an armature 590 connected by a link 591 with a clevis 592 (Fig. 49) connected by pin 593 with the arms 594 of a yoke 595 pivotally supported by pins 596. The yoke 595 is urged into the position shown in Fig. 49 by a spring 597 surrounding a rod 598 extending through a bracket 599 and connected by clevis 600 and pin 601 with the yoke arms 594. If the solenoid S1 is not energized the yoke 595 will remain in the position shown in Fig. 49 therefore it will remain in position to be engaged by a stop shoulder 602 of the slide 573 so that the slide can move only as far as shown in Fig. 53. This amount of movement is sufficient to cause the separation of the latch hooks 145 to release the switch from the block 142 and to elevate a roller 603 pivotally supported by the slide 573 to the position which causes the workholder block 151 to be moved to an inclined position and no further. When the attendant sees that the switch carried by the block 151 has been moved only to an inclined position, the attendant knows that the switch has failed to pass the test at station 9; and, he removes the switch and places it in a reject bin. If the switch has passed the test at station 9, the solenoid S1 would have been energized through a circuit to be described to cause the stop yoke 595 to be moved into the position shown in Fig. 54 before upward movement of the slide 576 has begun. Therefore when compressed air is admitted to the lower end of cylinder C6, the slide 573 moves toward position shown in Fig. 54 to cause engagement of the block 151 first by the roller 603 and then by a roller 604 pivotally supported by the slide so that the block 151 and the product switch supported thereby will be moved to vertical position preparatory to passing to stations 12 and 13 where the screws 105 and 106 (Fig. 1) are assembled with the terminals 103 and 104.

Admission of pressure fluid to the upper end of cylinder C6 effects return of slide 573 to the position shown in Fig. 49. During return movement of slide 573, its lug 573c engages roller 578 to cause levers 585 and 586 (Fig. 50) to return to normal position.

*Operations at station 11*

At station 11 (Fig. 16) a defective switch is removed from the workholder block 151 when inclined. If the switch is upright at Fig. 11, the clips 107 and 108 (Fig. 1) are placed upon the terminals 103 and 104, the tangs 107a and 108a of these clips being received by poles 103a and 104a respectively of the terminals 103 and 104.

*Operations at stations 12 and 13*

At stations 12 and 13 (Fig. 16) the screws 105 and 106 (Figs. 1 and 2) are respectively assembled with the switch terminals by means of automatic screw drivers. The functioning of these screw drivers is dependent upon the presence of a switch at these stations. Therefore a switch case feeler is provided at each of stations 12 and 13. These case feelers are shown in Figs. 55 through 58.

Referring to Figs. 55 and 57, cross bars 174 support a plate 610 which support a box-like frame comprising a base 611, side plates 612 and a top plate 613. Plate 613 supports bearing brackets 614 and 615 supporting bearings 616 and 617 respectively for shafts 618 and 619 respectively connected with meshing gears 620 and 621 respectively. Gear 620 meshes with a rack 622 provided by bar 623 guided by a grooved plate 624 and connected by a rod 625 with a piston in a cylinder C7 supported by a plate 626 attached to plate 610.

Cylinder C7 is controlled by valve V5 (Fig. 47) so that rod 625 moves left following indexing the conveyor and moves right before the next index. As rod 625 moves left (Fig. 56), shafts 618 and 619 rotate respectively clockwise and counterclockwise to move levers 630 and 631, attached respectively to these shafts, into the positions shown in Fig. 56 so that they may contact the case strap 120 (Fig. 2) of the product switch which is then vertical. Lever 631 carries a pin 632 pivotally supporting a feeler lever 633 urged counterclockwise by a spring 634 to engage strap 120 if the product switch is present. If the switch is absent from the holders at stations 12 and 13, spring 634 will move lever 633 against the plunger 635 of a switch which is designated SW27 for station 12 and SW33 for station 13. If switch SW27 opens, the screw driver at station 12 does not operate. If switch SW33 opens, the screw driver at station 13 does not operate.

Referring to Fig. 55, plate 610 supports a tubular post 640 supporting a vertically adjustable bracket 641 supporting a motor M5 connected by a pulley 642 and a belt 643 with a pulley 644 journalled on a bearing 645 supported by a sleeve 646 attached to bracket 641. Pulley 644 has a spline connection with a vertically movable shaft 647 journalled in bearings 648 supported by a quill 649 supported by bracket 641 and guided thereby for vertical movement. Quill 649 is connected by a crosshead 650 extending from a tube 651 with a cylinder 652 supported by bracket 641 and containing a piston 653 attached to tube 651 and urged upwardly by a spring 654 guided by a mandrel 655 supported by a cap 656 attached to tube 651. To cause downward movement of piston 653 and quill 649, pressure fluid is admitted to the upper end of cylinder 652 by a valve 657 having a plunger 658 which a spring in the valve urges against a lever 660 pivoted at 661 and connected by a link 662 with the armature 663 of a solenoid S14 which, when energized causes valve 657 to be conditioned for admission of pressure fluid to the upper end of cylinder 652 and quill 649 descends.

As quill 649 descends, a catcher 670 descends with it to carry a screw S (105 or 106 of Fig. 1), which it has caught from an automatic feeder, to a tapped hole in a product switch terminal aligned with the quill. Screw driver blade 671 descends with the quill to engage the screw and a clutch 672 is engaged so that the blade 671 is rotated by screw 647 to thread the screw into the terminal. The catcher jaws are resiliently biased away from screw retaining position and are maintained in screw retaining position by a sleeve 675 which is moved up relative to the catcher to effect screw release by a lever 676 pivoted at 677 and connected with a rod 678 connected with a piston in a cylinder C8 controlled by a valve V8 under control by solenoids S15 and S16 (circuit XX, Fig. 63). Solenoid S15 is timed for energization by closure of a switch SW30 near the end of the machine cycle to cause valve V8 to be conditioned for upward movement of sleeve 675 to release the screw. As upward movement of sleeve 675 nears completion a switch SW29 is closed by lever 676 to effect energization of solenoid S16 which conditions valve V8 so that the sleeve 675 is caused to descend to move the jaws of the screw catcher 670 together for retaining the next screw to be delivered by the screw feeder to the catcher.

A switch SW13 is closed by down movement of crosshead 650 to connect motor M5 with a current source.

The illustrated screw driver at station 12 may be one known to the trade as "Shakeproof." A different source driver known to the trade as "Chicago" may be used at station 13. This one is of the type having a head moved vertically by a compressed air servo device or air motor comprising a cylinder C9 (Fig. 55) mounted on a plate 690 supported by cross bars 74 and containing a piston connected by a rod 691 and a link 692 with a lever 693 pivoted at 694 on a channel-supported bracket 695 and connected by a rod with the screw driver head not shown. During down movement of the head, a screw is automatically fed from a screw feeder and is located in alignment with a tapped hole in a terminal of the product switch and a blade engages the screw to thread it into the tapped hole. The admission of pressure fluid to cylinder C9 is controlled by a valve V9 under control by solenoids S7 and S8 under control by cam operated switches SW14 and SW15 (circuit XVIII, Fig. 63).

As shown in Fig. 27, the post 149 has recesses 149a and 149b for receiving switch terminals 103 and 104 (Fig. 2), respectively, when the product switch is located at stations 12 and 13. The post 149 steadies the switch while screws are threaded into the terminals.

*Unloading good switches—Station 14*

Referring to Figs. 59 and 60, shaft 222 drives a cam 700 engaged by a roller 701 carried by a lever 702 pivoted at 703 on a bracket 704 supported by channels 175 and connected by a link 705 with a lever 706 attached to a shaft 707 journalled in brackets 708 and 709 and attached to a lever 710 carrying a nozzle 711 connected by a duct 712' in the lever and a duct 712 in the shaft with a stuffing box 713 connected by a pipe 714 with a valve 715 under control by a solenoid S13 under control by a cam switch SW8 (circuit XIV, Fig. 62). A spring 716 urges roller 701 against cam 700. At the proper time, cam 700 moves to permit spring 716 to lift lever 710 to locate nozzle 711 in alignment with holes 160, 161 of the work holder, and switch SW8 is closed to cause compressed air to be admitted to pipe 714 to cause a blast of air to issue from nozzle 711 to blow a switch from the work holder. The switch is caught by a chute (not shown) and is directed into a bin.

*Wiring diagrams*

Referring to Fig. 61, main switch MS connects a current source, for example 440 volts A. C. with wires L1, L2, L3. Motor M1 which drives the conveyor and cam shaft is connected with the source by the closing of contacts PR1a–b–d of relay PR1 having coil PR1c (circuit I) in series with thermal switches ts1 (opened by heaters h1 if motor M1 is overloaded), contacts R11a of relay R11, switch PS1 (closed when a compressed air source is connected with valves of the machine), start switch PB1a and stop switch PB1b, said series circuit being between wires 1 and 2 connected with secondary S1 of a transformer TR1 whose primary p1 is connected with wires L1 and L3. The closing of switch PB1a causes energization of coil PR1c if switch PS1 is closed; and contacts PR1a–b–d close to connect motor M1 with the wires L1–2–3 and contacts PR1e close to by-pass switch PB1a so that it can be released. Lamp L1 burns to indicate operation of motor M1.

After a work holder arrives at station 14, the completed product switch is ejected. If this switch is not ejected, switch SW11 (circuit II) normally held open by a spring is caused to close by virtue of engagement of the non-ejected switch with a switch actuating lever 730 (Fig. 27A) attached to a shaft 731 journalled on a bracket 732 which supports switch SW11. As lever 730 is moved counterclockwise by the non-ejected product switch, switch SW11 closes by its own spring. Normally, switch SW11 is held open by a spring 733 which urges shaft 731 clockwise so that arm 734 engages the plunger of switch SW11 to open it. At a time immediately after the next index, switch SW32 (Fig. 61, circuit II) is closed by cam 720. Then coil R11c of relay R11 receives current and contacts R11b (circuit VIIIB, Fig. 62) close and bell b1 rings and contacts R11a (circuit I) open and motor M1 stops. The reason for stopping motor M1 and ringing bell b1 is that the first operation, after ejection, is to feed the switch plunger automatically. Considerable damage would be done to the plunger feeder if a plunger were to be fed down upon the top of a switch that was not properly ejected.

Automatic feeding of the switch plunger is accomplished by the type of feeder which has a rotary drum operated by a motor M2, which is connected by contacts PR2a–b–d of relay PR2 when its coil PR2c is connected with wires 1 and 2. Since it would be detrimental to the polished surfaces of the switch plunger to tumble them continuously, the drum operating motor M2 is permitted to operate only when the feeder chute 314 (Fig. 28) requires plungers. The control of motor M2 requires several circuits. Circuit V includes stop switch PB2b, start switch PB2a, wire 34 and coil R10c of relay R10. The closing of switch PB2a connects coil R10c with wires 1 and 2, and contacts R10b close to by-pass switch PB2a which then can be released. Contacts R10a close in circuit III. Switch SW7 is normally closed and is opened only when the clutch control lever 296 (Fig. 25) is in the stop position because, when the machine is not operating, no parts are required and rotation of the drum should stop. When the feeder chute requires plungers, switch SW21 (circuit VI) connects wires 52 and 54. The next time the compressed air operated feeder plunger operates, switch SW20 closes. Since the chute needs more plungers, coil R8c of relay R8 is then connected with wires 1 and 2 and contacts R8a (circuit III) close and the following circuit is completed: wire 1, switch SW7 (closed while machine is running), normally closed contacts R9a of relay R9, contacts R10a of relay R10 (closed when coil R10c receives current), contacts R8a of relay R8 (closed when switch SW21 connects wires 52 and 54), thermal switches ts2 (opened by heaters h2 when motor M2 is overloaded) coil PR2c and wire 2. When this circuit is completed, motor M2 operates to rotate the feeder drum. As the feeder mechanism retracts, switch SW20 opens, but motor M2 continues to operate until the feeder chute is full because contacts PR2e have closed to by-pass contacts R8a which open when switch SW20 opens. When the chute is full, switch SW21 is moved to disconnect wire 52 from wire 54 and to connect wire 52 and 53. Then next time a plunger is fed and switch SW20 closes, coil R9c of relay R9 is connected with wires 1 and 2, and normally closed contacts R9a open and motor M2 stops.

The contact support feeder at station 6 is similar to the one which feeds plungers except that its operating motor M3 operates continually since the parts fed are not damaged by continuous rotation of the drum. Motor M3 is connected with wires L1–2–3 by contacts PR3a–b–d of relay PR3 whose coil PR3c is connected with wires 1 and 2 by closing switch PB3a which establishes the following circuit: wire 1, stop switch PB3b, start switch PB3a, wire 36, thermal switches ts3 (opened by heaters h3 when motor M3 is overloaded), coil PR3c and wire 2. Contacts PR3e close to by-pass switch PB3a which then may be released.

The switch is tested for proper closing and for proper opening when its plunger is respectively depressed and released, and for grounds. To check for proper closing, switch SW4 is closed by cam 722 (Fig. 65) at the time when test points A and B (circuit VIIIB) engage the switch terminals. Coil R3c of relay R3 receives current from secondary s3 of transformer TR3 whose primary is connected with wires 1 and 2 (circuit VIIIA). Normally closed switch SW2 (opened by cam 125 to reset relays R4, R5, R6) and closed contacts R3a then connect coil R5c with wires 1 and 2 (circuit IX). Contacts R5a close to by-pass contacts R3a so that coil R5c remains energized until cam 722 opens switch SW2 to reset relay R5. Contacts R5e close to connect solenoid S1 with wires 1 and 2 through the following circuit: wire 1, switch SW3 (when closed by cam 723 after the index of the next cycle), normally closed contacts R4a of relay R4, closed contacts R5e, normally closed contacts R6a of relay R6, solenoid S1 and wire 2 (Fig. 62). Solenoid S1, when energized, operates following the next index to move the tested switch to vertical position which indicates the switch is good and the switch remains in that position before passing to the screw driver stations.

By action of cam 535 (Fig. 47), the plunger of the tested switch is slowly released so that connection between the switch terminals is slowly broken. When the switch plunger has had time to return, switch SW5 is closed by cam 723. If there is no connection between the switch terminals, coil R2c does not receive current and contacts R2a (circuit IX) do not close and coil R6c of relay R6 does not receive current and contacts R6a (circuit XI) remain closed and solenoid S1 will be energized after the next index.

For the ground check, the switch terminals connected by points A and B are bridged by the switch contacts 103 and 104 of a switch to be tested and a contact point C grounds the switch case to the frame of the machine. If there is a ground, current will flow from secondary s2 of transformer TR2 through coil R1c of relay R1, the primary p2 of said transformer having been connected with wires 1 and 2 (circuit VIIIA) by switch SW1 closed by cam 721 after index. Lamp L2 (circuit VIIB) burns to indicate operativeness of the ground test transformer TR2. Relay coil R1c having been energized, contacts R1a of relay R1 close and the circuit to coil R4c of relay R4 (circuit IX) is complete when switch SW2 is closed after reset by cam 125. Contacts R4b close to by-pass contacts R1a so that coil R4c receives current until after the next index. Contacts R4a (circuit XI) open to prevent energization of solenoid S1 so that the switch is not moved to vertical position after the next index.

As stated before, if the switch does not bridge its contacts when the switch plunger is pressed to close the switch, or if the switch does not open its contacts when the switch plunger is released, solenoid S1 is not energized and the product switch is not moved to vertical position. Hence, if the product switch fails in one of the tests, solenoid S1 is not energized and a stop 595 (Fig. 49) which it controls is not retracted and the product switch is moved to an inclined position and the operator removes it from its work holder and places it in a reject bin. If the product switch passes all of the tests, coil R3c receives current and coils R2c and R1c receive no current and contacts R5e (circuit XI) are closed and remain closed together with normally closed contacts R4a and R6b so that solenoid S1 will be energized when switch SW3 is closed by cam 723 after the next index and the stop 595 is retracted by solenoid S1 at the time cam 571 (Fig. 54A) operates the turn-up air valve V6 to cause the product switch to move to vertical position. An operator places washers upon the product switch terminals preparatory to assembling screws at stations 12 and 13.

When cam 724 closes switch SW25 (circuit X), lamp L3 and good counter operating solenoid S3 receive current through switch SW25 normally closed contacts R4e and R6b, which do not open if product switch is good, and contacts R5d which are closed if product switch is good. If product switch fails in any test, contacts R4b or R6b would be closed or contacts R5d would remain closed and reject counter operating solenoid S5 would receive current and a bad switch would be counted when cam 724 closes switch SW25 after the index following the test. If no product-switches were in the holder at the push-up station, switch SW17 would be open at the time of push-up, but solenoid S5 would not be energized and the bad counter would not operate. Switch SW16 is required because, if the holder at the test station were empty, coil R3c would receive no current, coil R5c would receive no current and contacts R5b in circuit X would remain closed.

In circuit XII, there is a feeler switch SW6 (see Figs. 27B and 27C) which stays open if the product switch plunger is proper one. As shown in Figs. 27B–C, switch SW6 is supported by a bracket 740 pivotally supporting a shaft 741 which a spring 742 urges clockwise to cause an arm 743 to push the plunger 744 of switch SW6 to open it. Shaft 741 carries a feeler lever 745 for engaging the plunger 130 of the product switch. If the plunger 130 is of the correct length as shown, switch SW6 remains open. If a plunger which is too long should be accidentally mixed with the correct plungers in the feed hopper at station 1, at the station following, the longer plunger 130 will lift lever 745 to permit switch SW6 to close itself. At the time switch SW10 is closed by cam 721, coil R7c of relay R7 and lamp L4 receives current and contacts R7a close to by-pass switch SW10, and contacts R7b (circuit XIII) close to energize solenoid S2 which moves start-stop lever 296 (Fig. 25) to stop position. Therefore the machine is allowed to run until it has completed the index following the check for plunger length. When lever 245 reaches stop position, it opens switch SW7 and the circuit of solenoid S2 is broken.

The product switch is ejected at station 14 by the issuance of compressed air from nozzle 711 (Fig. 60) to blow the switch into a bin. The air blast is controlled by valve V10 controlled by solenoid S13 which receives current when switch SW8 is allowed to close by cam 122.

Circuit XV shows a control of the greaser stop retracting solenoid S4. When greasing should take place at station 4, cam 724 closes switch SW12 and the circuit to solenoid S4 is completed provided a product switch is present in the work holder as shown in Fig. 31. If the switch is absent, normally closed switch SW19 opens and solenoid S4 is not energized and the stop 406 (Fig. 32) is not retracted and greasing does not take place.

Circuit XVI shows the control of motor M5 and screw driver 1 at station 12. When the screw driver head descends switch SW13 (Fig. 55) is closed and motor M5 operates.

Circuit XVII shows the control for motor M4 which operates the #2 screw driver at station 13. Motor M4 is started by closing switch PB4a which energizes relay coil PR4c to effect the closing of contacts PR4a–b–d (Fig. 61, upper right) and the closing of contacts PR4e which by-pass switch PB4a. Motor M4 is stopped by opening switch PB4b or by the overheating of the motor which causes one or both of thermal switches ts4 to open.

A transformer TR4 has a primary p4 connected with wires 1 and 2 and a secondary s4 connected with wires 41, 31 and 40 to provide current for circuits XVIII and XVIX. Circuit XVIII shows the control for down and up movement of the #2 screw driver head of the screw driver at station 13. At the time for this screw driver head to move down, cam 725 closes switch SW15 and solenoid S8 is energized provided there is a product switch in the holder at station 13 so that switch SW33 remains closed. Energization of solenoid S9 conditions valve V9 (Fig. 55) for up movement of rod 691 and down movement of rod 696 and the #2 screw driver head. At the time when the head of the screw driver could move up, cam 725 closes switch SW17 to energize solenoid S7 which conditions valve V9 (Fig. 55) for down movement of rod 691 and up movement of rod 696.

Circuit 19 shows the controls for valves V1 (Fig. 28) and V3 (Fig. 35) located respectively at the plunger feeding station and the support feeding station. At the time when plungers and supports should be fed to the product switch, cam 726 closes switches SW23 and SW23a to effect energization of solenoids S10 and S10a respectively to effect plunger and support feeding. Before the next indexing, cam 726 has permitted switches SW23 and SW23a to open and has closed switches SW22 and SW22a to effect energization of solenoids S9 and S9a respectively to effect, respectively, the retraction of chute extension 318 (Fig. 28) and chute extension 419 (Fig. 35) from the path of movement of the work holders.

Transformer TR5 has a primary p5 connected with wires 1 and 2 and a secondary s5 connected with wires 69, 70 and 71 to supply current for circuit 20.

Circuits XX–XXIII show the control for the #1 screw driver. When this screw driver should operate cam 727 (circuit XXII) closes switch SW26 and relay coil R12c receives current provided there is a product switch at the work holder at station 12 to maintain closure of feeler switch SW27. Energization of coil R12c of relay R12 closes relay contacts R12a (circuit XXIII) to energize solenoid S14 which conditions valve 657 (Fig. 55) for down movement of the head of the #1 screw driver. When this screw driver head is down, switch SW28 closes to energize relay coil R13c (circuit XXI) thereby closing contacts R13d (circuit XX). At the time when the screw catcher should release the screw, cam 727 closes switch SW30 to energize solenoid S15 which conditions valve V8 (Fig. 55) to cause up movement of screw catcher release sleeve 675 so that the prongs of the catcher 670 separate to release the screw S. At the end of the release stroke of sleeve 675, switch SW29 closes to energize solenoid S16 which controls valve V8 for return of sleeve 675 to cause the screw catcher prongs to move together preparatory to catching a screw for the next operation.

Fig. 65 shows the cams 720 through 727 driven by cam shaft 222 and the switches which are respectively controlled by these cams. Each cam is engaged by a roller 750 carried by a lever 751 pivoted at 752 on a bracket 753 supported by the machine frame. The lever 751 is urged to the left by the cam associated with it and to the right by a spring 754. The timing of all of the cams is shown in Fig. 66.

While the embodiments of the present invention as herein disclosed, constitutes a preferred form it is to be understood that other forms might be adopted.

What is claimed is as follows:

1. In a machine for assembling a switch having a case, a case cover supporting fixed contacts in the case and switch terminals outside the case, a movable contact in the case and a plunger for operating the movable contact, apparatus comprising a plurality of work holders each providing for support of a switch with its terminals horizontal so that tapped holes in the terminals will be vertically disposed, a conveyor for moving the holders successively to a screw applying station, an automatic screw driver at the screw applying station which locates a screw in alignment with a tapped hole in a switch terminal and applies a rotating screw driver blade thereto, mechanism for indexing the conveyor and causing operation of the screw driver and means for withholding operation of the screw driver if no switch is present at the screw applying station.

2. Apparatus according to claim 1 in which the automatic screw driver is one having a vertically movable head which the mechanism causes to descend after the conveyor has been indexed, said screw driver having a screw catcher for receiving a screw from a screw feeder and having a sleeve movable on the catcher to cause it to release the screw, said apparatus having means for moving the sleeve to screw release position ahead of the next conveyor indexing operation and for returning the sleeve to screw catcher screw-retaining status immediately following the screw-releasing movement of the sleeve, and means for withholding operation of the sleeve moving means if the screw driver head fails to descend.

3. In a machine for assembling a switch having a case and cover enclosing a switch movable contact and a plunger for actuating the movable contact, apparatus comprising work holders each for supporting the plunger and the case in position for assembly of parts in the case and the cover upon the case and providing a plunger receiving tube movable from a horizontal to a vertical position after switch assembly, a conveyor for moving the holders successively past a plurality of stations including, a test station, a switch push-up station and an unloading station, means at the push-up station for engaging the switch to move it and the tube of the holder to vertical position, means for testing the operation of the switch while at the test-station and including apparatus for rendering the push-up apparatus ineffective to move the switch to vertical position if the switch fails to pass the test at the test station, and means at the unloading station for ejecting a switch which has passed the test and which consequently has been moved to vertical position at the push-up station, said ejecting means comprising a nozzle which is moved into alignment with the plunger supporting tube and under the plunger and means for causing an air-blast to issue from the nozzle.

4. In a machine for assembling a switch having a case supporting a terminal having a tapped hole and an operating plunger, apparatus comprising work holders each providing for reception of the plunger and case, a conveyor for moving the holders successively to a plunger loading station and to a screw driver station, a power-driven screw driver at the latter station having a head advanceable toward the switch to thread a screw into the tapped hole of the terminal, a mechanism for indexing the conveyor and for causing thereafter the advancing of the head to assemble the screw and the retraction of the head after assembly of the screw with the terminal, means for detecting a switch in the work holder at the plunger loading station, means for detecting that the screw driver head is not retracted at a certain time before the next conveyor indexing, and a device under control by both of said detecting means for stopping the mechanism either when there is a switch in the work holder at the plunger loading station or when the screw driver head is not retracted at a certain time before the next conveyor indexing.

5. In a machine for assembling a switch having a case supporting a terminal having a tapped hole and an operating plunger, apparatus comprising work holders providing for reception of the plunger and case, a conveyor for moving the holders successively to a plunger loading station and to a screw driver station, a power-driven screw driver at the latter station having a head advanceable toward the switch to thread a screw into the tapped hole of the terminal, an electric motor for driving the mechanism, normally closed relay contacts for maintaining establishment of the motor with a current source, a relay having a coil which, when energized, opens said contacts, means for connecting the relay coil with a current source and including two circuits in parallel, one circuit including a switch which is closed while the screw driver head is advanced and a switch which is closed by said mechanism at a certain time before the next conveyor indexing, the other circuit including a switch which is closed by the mechanism after indexing, and a switch which is closed if there is a switch in the work holder at the plunger loading station.

6. In a machine for assembling a switch having a case and an operating plunger, apparatus comprising work holders each adapted to receive a plunger and then a case, a conveyor for moving the work holders in sucession to a plunger loading station, a plunger feeder at the plunger loading station and comprising a hopper feed, an electric motor for operating it, a chute receiving plungers from the hopper feed and guiding them to the work holder, a plunger release intermediate the ends of the chute to permit the plungers to gravitate singly through the lower end of the chute from a supply of plungers in the upper portion of the chute, a mechanism for operating the conveyor and the plunger release in sequence, a relay switch having a magnet coil the energization of which causes the relay to connect the motor with a current source, second and third relay switches each having a magnet coil and having respectively normally open and normally closed contacts in series to connect the coil of the first relay with a current source, and a circuit for selectively controlling energization of the coils of the second and third relays said circuit comprising a first switch in series with a second switch which is normally connected with the coil of the third relay and which is movable to a second position to disconnect said third relay coil and to connect the second relay coil with said first switch, means operated by the plunger release for closing the first switch once during the cycle of operation of the plunger release and for urging the second switch into its second position and means for preventing movement of the second switch into its second position when a certain quantity of plungers occupies the upper portion of the chute.

7. In a machine for assembling a switch having a terminal provided with a tapped hole, apparatus comprising work holders each for supporting the switch in a position such that its terminal is horizontal and the tapped hole extends vertically, a conveyor for moving the work holders in succession to assembling stations and a screw driver station, an automatic power operated screw driver at the last mentioned station, a timing switch, mechanism for operating the conveyor and the timing switch in sequence, a solenoid for effecting, when energized, operation of the screw driver to apply and thread a screw through said tapped hole of the switch terminal, and means for effecting connection of the solenoid with a current source, said means including the timing switch and a feeler switch which is closed when a product switch is present on the work holder at the screw driver station.

8. Apparatus according to claim 7 further characterized by the provision of a screw catcher including a release therefor, in combination with the screwdriver, said screw catcher being adapted to receive a screw from the screw feeder and hold said screw in position for engagement by the screwdriver, means for operating the screw catcher release, first and second solenoids respectively for effecting advancement and retraction of the screw catcher release operating means, a circuit for connecting the first solenoid with a current source and including a timing switch operated by said mechanism and a switch closed in response to operation of the screwdriver to assemble a screw with the switch terminal, and a circuit for connecting the second solenoid with a current source and including a switch which is closed upon completion of the advancement of the screw catcher release operating means.

References Cited in the file of this patent

UNITED STATES PATENTS

| Number | Name | Date |
|---|---|---|
| 1,288,125 | Muller | Dec. 17, 1918 |
| 1,729,977 | Avis | Oct. 1, 1929 |
| 1,793,236 | McDonough | Feb. 17, 1931 |
| 1,842,830 | Homes | Jan. 26, 1932 |
| 1,928,934 | Green | Oct. 3, 1933 |
| 2,058,976 | Gray | Oct. 27, 1936 |
| 2,081,441 | Willshaw et al. | May 25, 1937 |
| 2,192,106 | Ross et al. | Feb. 27, 1940 |
| 2,201,562 | Paulson | May 21, 1940 |
| 2,209,340 | Landry | July 30, 1940 |
| 2,221,323 | Gammeter | Nov. 12, 1940 |
| 2,252,498 | Flaws | Aug. 12, 1941 |
| 2,266,302 | Blair | Dec. 16, 1941 |
| 2,272,279 | Schindel | Feb. 10, 1942 |
| 2,314,760 | Blair | Mar. 23, 1943 |
| 2,333,232 | Bleam et al. | Nov. 2, 1943 |
| 2,371,140 | Alling et al. | Mar. 13, 1945 |
| 2,387,083 | McCain | Oct. 16, 1945 |
| 2,430,080 | Reynolds | Nov. 4, 1947 |
| 2,483,910 | Kennedy | Oct. 4, 1949 |
| 2,503,803 | Cremer | Apr. 11, 1950 |
| 2,539,070 | Gebo | Jan. 23, 1951 |
| 2,540,843 | Stover | Feb. 6, 1951 |
| 2,566,767 | Hunt | Sept. 4, 1951 |
| 2,615,327 | Foust et al. | Oct. 28, 1952 |
| 2,616,324 | Bailey et al. | Nov. 4, 1952 |
| 2,617,527 | Smith | Nov. 11, 1952 |